United States Patent
Ott et al.

(10) Patent No.: US 6,282,954 B1
(45) Date of Patent: Sep. 4, 2001

(54) SYSTEM FOR CHANGING A ROTATIONAL SPEED SIGNAL

(75) Inventors: Karl Ott, Markgroningen; Michael Lehner, Muhlacker; Michael Walther, Ludgwigsburg; Thomas Schneider, Markgroningen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/809,270

(22) PCT Filed: Jul. 3, 1996

(86) PCT No.: PCT/DE96/01178

§ 371 Date: Mar. 6, 1997

§ 102(e) Date: Mar. 6, 1997

(87) PCT Pub. No.: WO97/08674

PCT Pub. Date: Mar. 6, 1997

(30) Foreign Application Priority Data

Aug. 26, 1995 (DE) ............................................. 195 31 422
Dec. 15, 1995 (DE) ............................................. 195 46 812
Mar. 8, 1996 (DE) ............................................. 196 09 062

(51) Int. Cl.[7] ........................... G01P 15/00; B60K 20/00; B60K 41/20; B60T 8/32

(52) U.S. Cl. ........................ 73/488; 180/197; 303/121; 361/236; 477/20; 477/40; 477/183

(58) Field of Search ................................ 73/488, 506, 507, 73/509, 514.39; 324/160, 161, 165, 166, 167, 168, 169, 170, 173, 177, 178, 179, 207.25, 207.2; 340/671, 672; 364/565; 180/197, 337; 303/121; 361/236; 477/183, 20, 40

(56) References Cited

U.S. PATENT DOCUMENTS 3,812,710  5/1974  Bauman et al. ..................... 73/114

(List continued on next page.)

FOREIGN PATENT DOCUMENTS 2606012  8/1977  (DE).
3703658  8/1988  (DE).
4322440  2/1995  (DE).
276368   8/1988  (EP).

*Primary Examiner*—Richard A. Moller
(74) *Attorney, Agent, or Firm*—Fulbright & Jaworski, LLP

(57) ABSTRACT

The invention is based on a system for changing a signal representing rotational motion in a motor vehicle with first means for generating a first signal representing the rotational motion and a second means for generating at least one second signal representing additional information (direction of rotation, air gap, and/or brake lining wear). In addition, a third means is provided, by means of which the first signal (rotational speed signal) can be changed as a function of the second signal (direction of rotation, air gap, and/or brake lining wear). The essence of the invention is that the first means is designed in such a way that the first signal (rotational speed signal) assumes at least two first current values and/or two first voltage values. In addition, the third means is designed in accordance with the invention in such a way that, to change the first signal (rotational speed signal), at least one of the first current values and/or voltage values can be changed at least for a certain period of time into at least one second current value and/or voltage value as a function of the second signal (direction or rotation, air gap and/or brake lining wear).

23 Claims, 15 Drawing Sheets

U.S. PATENT DOCUMENTS

| | | | |
|---|---|---|---|
| 4,076,330 | 2/1978 | Leiber | 303/92 |
| 4,916,643 | 4/1990 | Ziegler et al. | 364/557 |
| 5,043,658 * | 8/1991 | Braschel et al. | 324/160 |
| 5,140,260 * | 8/1992 | Braschel et al. | 324/160 |
| 5,432,442 * | 7/1995 | Andersen | 324/174 |
| 5,500,585 * | 3/1996 | Aab | 324/165 |

* cited by examiner

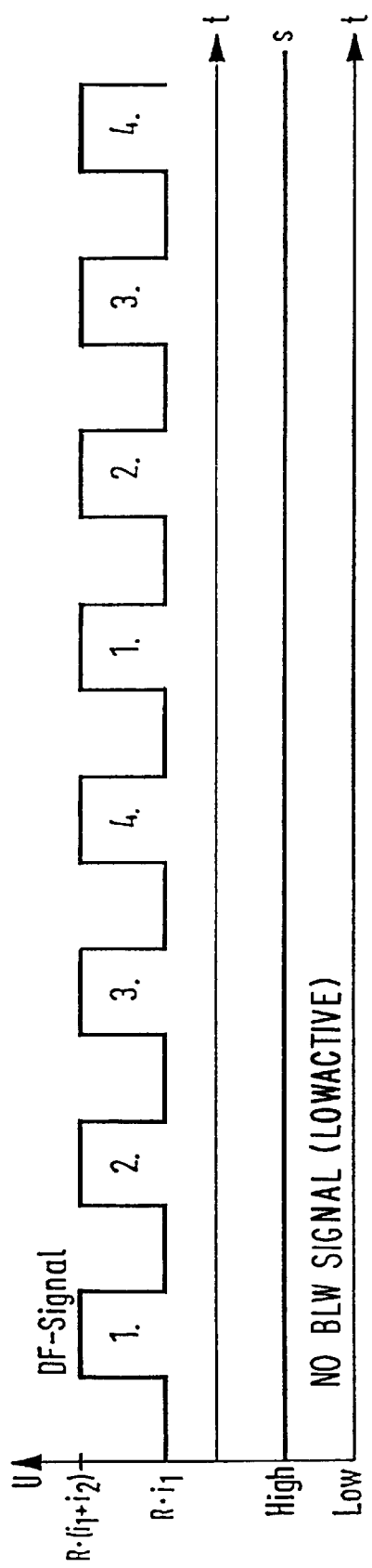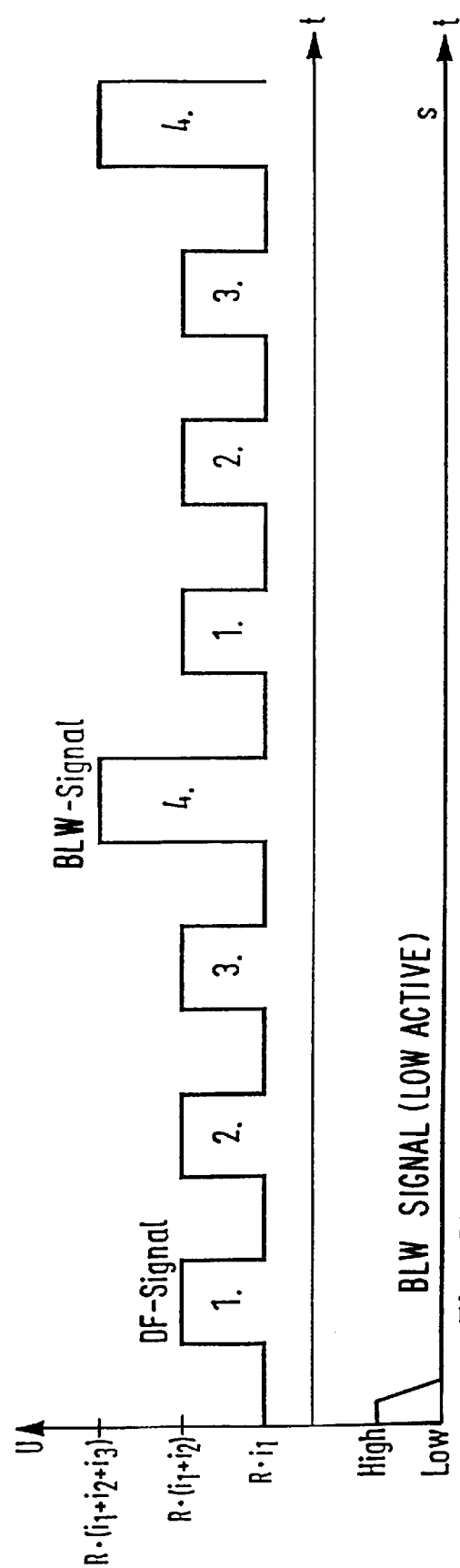

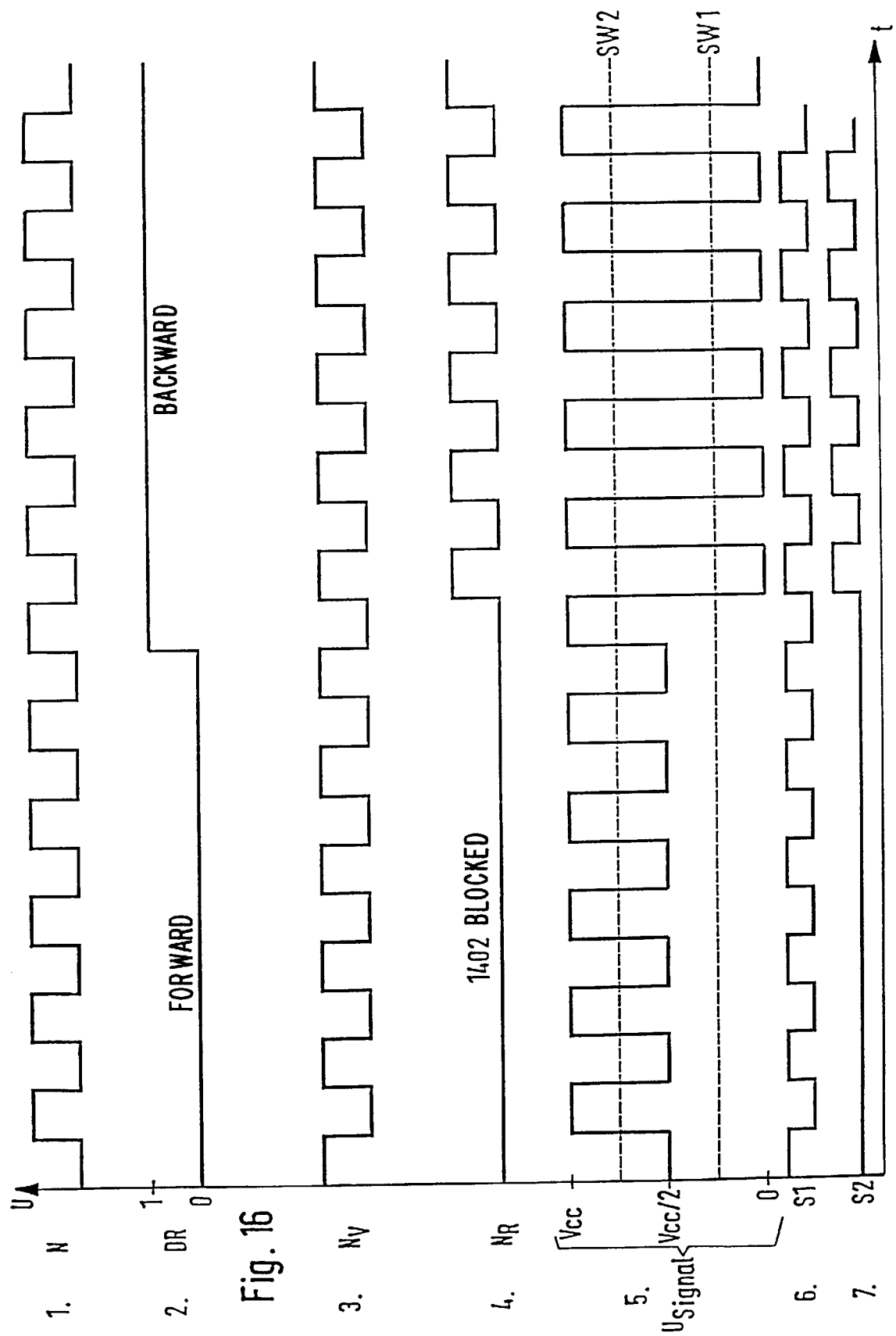

SYSTEM FOR CHANGING A ROTATIONAL SPEED SIGNAL

BACKGROUND OF THE INVENTION

The invention is based on a system for changing a signal representing the rotational speed of at least one, wheel of a motor vehicle. For the closed-loop or open-loop control of the braking force, drive power, and/or dynamics of motion of a motor vehicle, it is known that the rotational speeds of the wheels of the vehicle can be measured. The state of the art provides various methods (e.g., Hall or magnetoresistive sensors) for this purpose. In addition, it is known that the point at which the brake lining of a vehicle brake becomes worn out can be determined by, for example, embedding contact pins a certain depth below the surface of the brake lining. When the brake lining has been worn down to this depth, the pins trigger a contact.

Active sensors for use in open-loop or closed-loop antilock, drive slip, engine, and transmission control systems in motor vehicles are described in, for example, the article "Integrierte Hall-Effekt-Sensoren zur Positions-und Drehzahlerkennung", eletronik industrie, Vol. 7, pp. 29–31, 1995. In a two-wire system, sensors of this type supply two current levels, which are converted by a precision resistor into two voltage levels in a corresponding control device.

In addition to the Hall-effect sensors mentioned above, it is also possible to use magnetoresistive sensors to detect rotational speeds. This is known from, for example, the article "Neue, Alternative Lösungen für Drehzahlsensoren im Kraftfahrzeug auf magnetoresisitiver Basis", VDI-Berichte, No. 509, 1984.

A special shared device for detecting brake lining wear and the rotational speed of a wheel is described In DE-C2 26 06 012 (U.S. Pat. No. 4,076,440). For this purpose, the detected brake lining wear and the wheel speed detected by means of an inductive sensor are sent over a common signal line to an evaluation unit. This is achieved in that the wheel speed sensor is entirely or partially short-circuited in reaction to the detected amount of brake lining wear.

To detect the rotational speed of the wheel and the brake lining wear at the wheel brake, other systems, such as those described in DE-C 43 22 440, require at least two signal lines between the wheel unit and the evaluation unit.

In regard to the detection of rotational speed described above, it is known that the air gap between the rotating toothed wheel rim and the actual sensor element has a considerable effect on the quality of the rotational speed signal. In reference to this point, see, for example, DE-OS 32 01 811, for example.

In addition, in the case of systems to help the driver get the vehicle started (so-called "hill holders"), for example, information on the rotational direction of the wheels is also required. Here it is especially necessary to known if the vehicle is moving backwards. See, for example, DE-OS 35 10 651 on this point.

The information cited above and other types of data (such as data on the degree of brake lining wear, the size of the air gap, and the direction of rotation) are usually detected close to the wheel and evaluated in a control unit located some distance away from the wheel. The information must therefore be transmitted to the control unit.

In the case of an engine (internal combustion engine or electric motor), it is known that the rpm's of the engine can be detected by means of inductive, magnetoresistive, or Hall sensors.

The task of the present invention is to provide means for transmitting the rotational speed signal and additional information in the simplest possible, reliable manner.

BRIEF SUMMARY OF THE INVENTION

The invention is based on a system for changing a signal representing a rotational movement with a first means for generating a first signal representing the rotational movement and a second means for generating at least one second signal representing an additional type of information. Such information can consist in, for example, the determination of the direction in which rotation is occurring and/or of the size of the above-cited air gap and/or of the degree of the brake lining wear in at least one brake of the vehicle. The air gap can be determined on the basis of the amplitude of a signal associated with the rotational speed signal. A third means is also provided, by means of which the first signal (speed signal) can be changed as a function of the second signal (direction of rotation, air gap, and/or brake lining wear).

The core of the invention now consists in that the first means is designed in such a way that the first signal (rotational speed signal) assumes at least two first current values and/or two first voltage values. In addition, the third means according to the invention is designed in such a way that, to change the first signal (rotational speed signal), at least one of the first current values and/or voltage values can be changed for at least a certain period of time to at least one second current value and/or voltage value as a function of the second signal (direction of rotation, air gap, and/or brake lining wear).

The invention offers the advantage that, in a simple and reliable manner, the additional information concerning direction of rotation, air gap, brake lining wear, and/or other operating conditions of the vehicle, of the vehicle brake, and/or of the vehicle engine can be transmitted over the output line of the rotational speed sensor. As a result, it is possible to eliminate, for example, the above-mentioned second signal line for the exclusive transmission of the additional information.

Another advantage of the invention consists in that the speed sensor and the detector of the above-cited additional information form a compact unit.

The system according to the invention is used advantageously in a motor vehicle, where the first signal can represent the rotational speed of a vehicle wheel; the rpm's of the vehicle's engine, which can be either a gasoline or diesel engine or an electric motor; and/or the rpm's of a shaft operationally connected to the vehicle's transmission.

In a variant, the invention is used in a wheel speed sensor unit, such as that used in conjunction with an antilock, drive slip, and/or automatic driving dynamics control system. Here the wheel speed information can be sent together with at least one of the additional types of information cited above (direction of rotation, air gap, and/or brake lining wear) from a sensor unit located close to the wheel to a control unit located some distance away from the wheel in a low-cost and reliable manner.

Another variant of the invention pertains to the possibility of using the system according to the invention to detect the rpm's of the engine. In this application, too, the engine rpm information can be sent together with at least one of the above-mentioned additional types of information from a sensor unit near the engine to a control unit some distance away from the engine in a low-cost and reliable manner. The additional information to be transmitted in this case includes in particular information on the backwards rotation of the engine. An internal combustion engine turns backwards primarily when the engine is being started and when it is stalling. With the systems being used at present, so-called intake manifold "bangs" can occur. An engine control unit with conventional speed sensors (which do not recognize backwards rotation) continues to receive a speed signal when the engine is rotating backwards, but it cannot tell that the engine is turning in the wrong direction. Because the engine is turning in the wrong direction, the ignition angle will be off by a wide margin the next time an injection or ignition is initiated. If the fuel intake valve is open when ignition occurs, the above-mentioned intake manifold "bangs" will occur. These bangs in the intake manifold can lead to the destruction of the following components:

the idling regulator, the throttle valve, the intake manifold itself, and possibly the pressure gauge or the known hot-film air mass flow meter.

If it is possible to detect when the engine is turning backwards, it will be possible to avoid bangs in the intake manifold by preventing ignition from occurring. In this way, it will be is possible in turn to prevent the destruction of the above-mentioned components in a reliable manner. It is also possible that, in cases where the system according to the invention is used, these components could be designed to meet less stringent requirements. For example, the intake manifold could be made of plastic, which would lead to savings in both cost and weight.

The cost of modifying conventional systems in the manner required by the system according to the invention is relatively small, because the only items which must be added to the conventional sensor are a rotational direction evaluator and a relatively simple logic circuit. The input circuit of the control device according to the invention must be modified in such a way that the signal voltage can be evaluated with respect to two different thresholds. With respect to geometry and the installation location, no changes or restrictions in comparison to conventional sensors without rotational direction detection are involved.

The first means according to the invention can be designed as an active rotational speed sensor, and the third means can be designed in such a way that, to change the first signal, at least one of the first current values is increased for at least a certain period of time to a second current value as a function of the second signal.

In an advantageous embodiment of the invention, the third means for changing the current values has a current source. In particular, it is provided that the third means has switching means for turning on and off the superimposition of the first current values, at least two of which are present, onto a current induced by the current source. In this embodiment, therefore, it is provided that an additional current source is present in the rotational speed sensor, this current source being activated (or deactivated) by the presence of certain types of information (e.g., backwards rotation, a certain degree of brake lining wear, too large an air gap). When this additional current source is activated, at least one of the current levels which represent the rotational speed to be detected is raised. The additional current source can be integrated into the sensor or designed as a separate component.

The increase in level can involve both current levels; this is equivalent to an offset on the entire rotational speed signal, the offset being a function of the rotational direction, the air gap, and/or the brake lining wear. In particular, however, it is provided that only one of the two current levels is given an offset as indicated above.

The additional current source is usually activated by switching means, which superimposes the current levels representing the rotational speed the current pf this additional current source. But it can also be provided that the additional current source is turned on or off as a function of the presence of backwards rotation, an excessive degree of brake lining wear, and/or an excessive air gap.

The additional current source can be activated as a result of a first switch and a second switch, this second switch preferably being designed as a transistor. In cases where excessive brake lining wear is being detected, it is advantageous for the first switch to be installed near the brake lining and for the second switch to be provided near the rotational speed sensor. This embodiment is especially advantageous when the additional current source forms a structural unit with the speed sensor known in and of itself in either an integrated or separate design. The switching status of the second switch can be changed in a manner known in and of itself in that, for example, contact pins are embedded a certain depth below the surface of the brake lining. A contact is triggered when the brake lining has been worn down to the depth of the pins.

In this embodiment, it can be provided that the switching status of the first switch depends on the degree of brake lining wear and that the switching status of the second switch depends on the switching status of the first switch.

The active rotational speed sensor can be designed in such a way that it has two current sources to generate the first current values, at least two of which are possible.

It is advantageous, furthermore, to provide transmission means for transmitting the first signal or the changed first signal to the evaluation means (control unit). Conversion means can be provided in the evaluation means to convert the current values to the corresponding voltage values.

For the evaluation of the signals sent to the control unit, at least one threshold comparison can be provided in the evaluation means, by means of which the current values or the corresponding voltage values are compared with at least one threshold value. As a function of the result of this comparison, it is then possible to drive display means, which show when an excessive air gap and/or excessive brake lining wear is present.

In a highly advantageous embodiment of the invention, it is provided that the third means is designed so that the time at which the increase depending on the second signal occurs is determined in such a way that at least one of the two first current values is increased when this current value has occurred a defined number of times. This defined frequency can be selected differently as a function of the information to be transmitted.

In particular, in this last-mentioned embodiment, it can be provided that the first means is designed in such a way that the first signal (rotational speed signal) periodically assumes the two first current values, and that at least one of the two first current values is increased when the first signal (rotational speed signal) has assumed this current value n times, where n stands for a number greater than or equal to one.

The last-mentioned embodiment of the invention relates to the above-mentioned offset on only one of the two current levels. This variant has the advantage that, in comparison to the above-described information-dependent offset on the entire rotational speed signal, here, only one of the two current levels, usually the high level, of the rotational speed signal is increased in the presence of a certain type of information (backwards rotation, an air gap large enough or brake lining wear significant enough to warrant a warning message). As a result, the overall signal with the information pertaining to the rotational speed and the other information can be evaluated more easily in the control unit.

In addition to the data-dependent increase of every high level of the rotational speed signal, it can also be provided in particular that only every n-th high level is increased in an data-dependent manner. Thus, it can be provided, for example, that, when backwards rotation has been detected, every 2nd high level (n=2) is increased; when an excessive air gap is detected, every 4th high level (n=4) is increased; and/or when excessive brake lining wear is detected, every 8th high level (n=8) is increased.

This can be achieved by means of counters, which, when a certain type of information is present, such as a degree of braking lining wear which warrants a warning message, impose an offset depending on, for example, the brake lining wear only on every n-th high signal. In regard to the transmission of the brake lining wear, furthermore, this variant of the invention has the advantage that any possible rebounding of the brake lining wear switch will not result in an incorrect display, because the offset is initiated only after n high levels have occurred.

In both variants (offset on the entire rotational speed signal or offset on the n-th high level), it can be provided that the change in the first signal (rotational speed) occurs as a function of a signal representing the temperature of the vehicle brake and/or of the rotational speed sensor. The change in the first signal (rotational speed), furthermore, can also be actuated as a function of a signal representing the supply voltage of the rotational speed sensor.

It envisioned in particular here that, when the temperature of the sensor unit exceeds a certain critical value and/or when the supply voltage falls below a certain critical value, a display of the information which might be false under the circumstances such as information concerning brake lining wear is prevented. The temperature of the vehicle brake and/or of the rotational speed sensor or the undervoltage is detected in this case by appropriate sensors or circuits and comparators.

The second variant (offset on the n-th high level) also offers another advantage, namely, that any rebounding of the above-mentioned comparators or sensor circuits which may occur does not result in an incorrect display, because the offset is initiated only after n high levels have occurred. As a result of the second variant, the advantageous result is achieved that there is no longer any need for hysteresis behavior as a countermeasure against such rebounding.

As a result of the second variant, furthermore, there is no longer any need for hysteresis, which, while the vehicle is stopped or while the engine is off, prevents the data-dependent offset, especially the offset relevant to brake wear, from being permanently turned on or off, which would cause the (wheel) rotational speed evaluator to believe that a wheel was rotating when it in fact was not.

A possible additional variant of the invention consists in the use of the system according to the invention in an automatic vehicle control, in which the suspension system (springs, shock absorbers) of the wheel units are adjusted. In this case, the important input signals which are sensed are usually those which indicate the relative motions between the vehicle body and the wheels, i.e., the so-called "spring deflections" (spring deflection distance, spring deflection speed). In this case, it is also necessary to know, for example, the direction of the motion (compression or tension stage of the shock absorbers/springs). According to the invention, a first means for generating a first signal representing the relative motion and a second means for generating at least one second signal representing additional information are provided. The second means can be designed in such a way that the generated second signal contains information on whether the vehicle body is moving toward or away from the wheel unit. In addition, a third means is designed in such a way that the first signal can be changed as a function of the second signal.

The essence of this variant consists in that the first means is designed in such a way that the first signal assumes at least two first current values and/or at least two first voltage values. The third means is then designed in such a way that, to change the first signal, at least one of the first current values and/or at least one of the first voltage values can be changed at least for a certain period of time to a second current value and/or to a second voltage value as a function of the second signal.

Additional advantageous embodiments can be derived from the subclaims.

BRIEF DESCRIPTION OF THE DRAWINGS

FIGS. 6a and 6b show the signals courses associated with the designated circuits when the switch is closed and opened, respectively.

DETAILED DESCRIPTION OF THE INVENTION

The invention is to be described in detail on the basis of the forms of embodiments described in the following.

The figure shows a functional block diagram of a system for determining brake lining wear and the rotational speeds of the wheels of a motor vehicle.

Reference numbers 11a–d designate the wheel units of a motor vehicle. These wheel units include specifically the wheels, the peripheral velocities (rotational speeds) of which are to be measured, and the brake systems (friction brakes), one of which is assigned to each wheel unit. Reference numbers 102a–d designate the rotational speed and brake lining wear sensors assigned to each wheel, which, insofar as the invention is concerned, are described in greater detail on the basis of FIGS. 2 and 3. With respect to the aspects of the design of these sensors which goes beyond the scope of the invention, explicit reference is made to the state of the art cited above.

The output signals of the rotational speed and brake lining wear sensors 102a–d are connected to a control unit 103; the transmission lines are designated 105a–d. The data transmitted by means of transmission lines 105a–d are then evaluated centrally for all wheel units in control unit 103. The status of the brake linings, as the evaluation result, is sent by control unit 103 over lines 18a–d to a display instrument 110. For this purpose, it is provided in general that the driver is informed appropriately whenever the wear of one or more brake linings has exceeded a certain value.

For the sake of completeness, reference numbers 14$a$–$d$ designate the brake systems of the individual wheel units 11$a$–$d$, which can be actuated by control unit 103.

Figure 1:
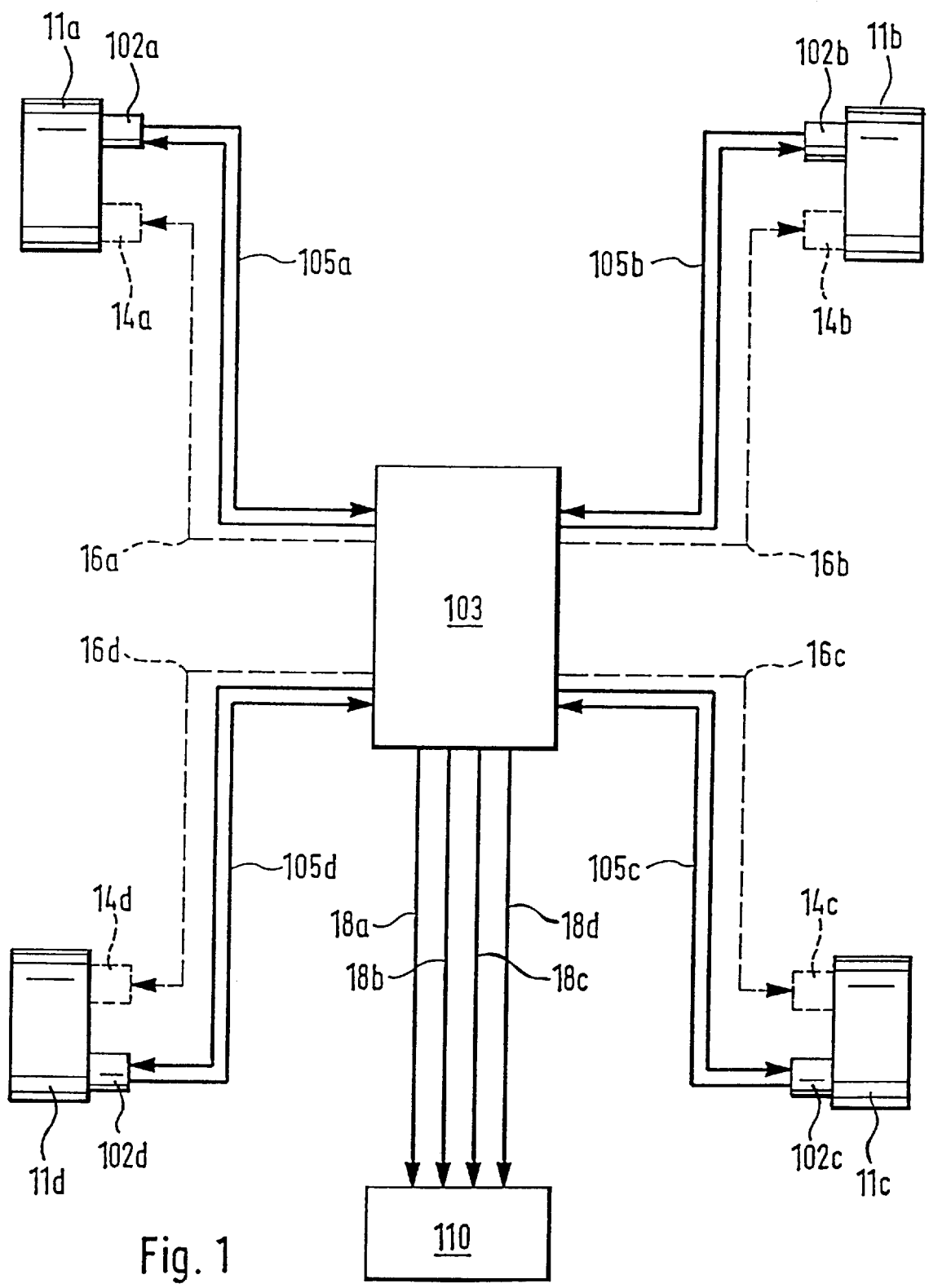
FIG. 1 shows schematically a functional block diagram as known according to the state of the art.
Figure 2:
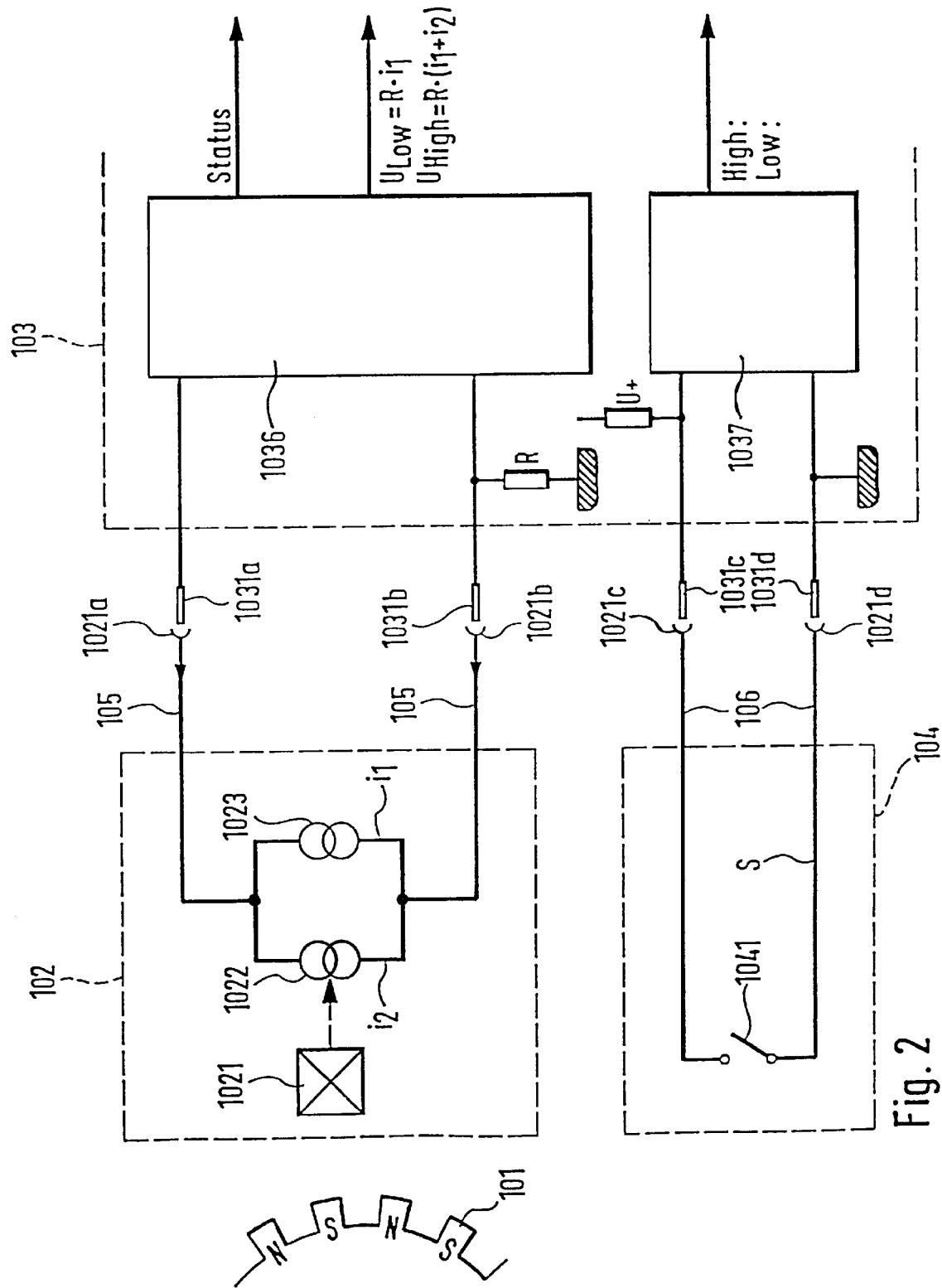
FIG. 2 shows a simple combination of an active rotational speed sensor with brake lining wear detection.

FIGS. 2 and 3 show various embodiments on the basis of a single wheel unit by way of example.

FIG. 2 shows a simple combination of an active rotational speed sensor with a brake lining wear detection function. As already mentioned above, a known Hall rotational speed sensor or a known magnetoresistive rotational speed sensor can be provided as "active" rotational speed sensor 102. It can be seen schematically in FIG. 2 that a sensor element 1021 samples an incremental rotor 101 of a magnetically passive type. Depending on the sampled increments of rotor 101, two current levels $i_1$ and $i_2$ are transmitted by sensor element 1021. This is shown in FIG. 2 as the turning on and off of two current sources 1022, 1023.

Speed sensor 102 is connected to control unit 103 by lines 105 and plug connections 1021$a$, $b$ and 1031$a$, $b$. With the help of input resistor R, input amplifier 1036 detects the voltage values corresponding to the current levels of rotational speed sensor 102:

$$U_{LOW}=R^*i_1$$

$$U_{HIGH}=R^*(i_1+i_2)$$

Figure 4:
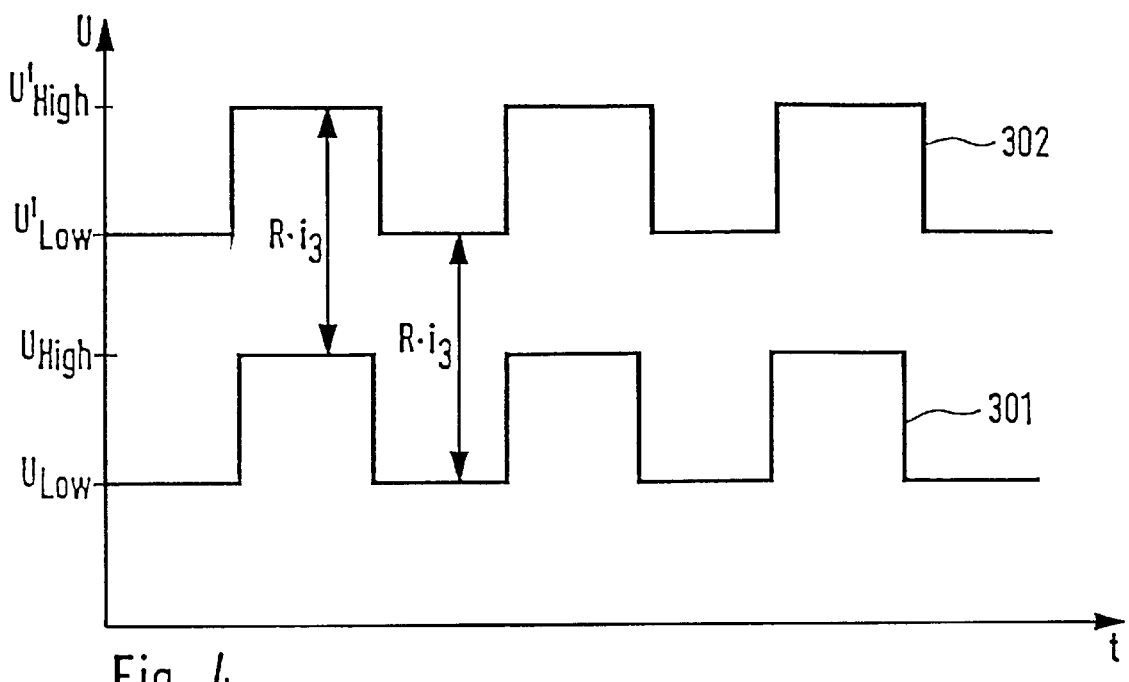
FIG. 4 shows the courses of the associated signals. A second design variant of the system according to the invention in the case of brake lining detection is shown in FIGS. 5 and 6.

The lower signal (301) in FIG. 4 is typical of the course of the signal produced by a wheel with an essentially constant rotational speed. The desired value, i.e., the rotational speed of the wheel, is obtained by evaluating the frequency of this signal.

The lower half of FIG. 2 shows ◄ in schematic fashion a known detector 1104 of brake lining wear in a wheel brake. As already mentioned above, the brake lining wear sensor known in and of itself according to the state of the art determines the wear of the brake lining of a vehicle brake by the use of contact pins, for example, which are embedded in the brake linings a certain distance below the surface. These pins trigger a contact when the brake lining has been worn down to this depth. In FIG. 2, this contact is designated as switch 1041. In the normal case (brake lining wear not severe enough to warrant a warning), switch 1041 is open, and voltage U+ is not grounded. Once the brake lining has worn down to a certain extent, switch 1041 closes, which is detected in evaluation circuit 1037 because of the grounding by connection 106 or plug connections 1021, 1031.

As can be seen from the embodiment shown in FIG. 2, separate signal lines 105, 106 are required to transmit the wheel speed information and the information concerning the status of the brake lining.

The system according to the invention is now to be explained on the basis of FIG. 3. Rotational speed sensor 102 described in conjunction with FIG. 2 has been supplemented here by an additional current source 1023, which is wired in parallel with the rotational speed sensor shown in FIG. 2. Another additional current source 1024 can be connected to the circuit between the rotational speed sensor and the evaluation unit through transistor 1025 by means of connections 1027, 1026.

Transistor 1025 is driven by a signal S, which comes from switch 1041, already described on the basis of FIG. 2. Switch 1041 changes its switching status when it has been detected that the brake lining has worn down to a certain degree.

In FIG. 3$a$, the rotational speed sensor described on the basis of unit 102 in FIG. 2 and the additional current source 1024 and transistor 1025 are shown combined into a unit 102'. When transistor 1025 is switched to the conducting state, current $i_3$ is added to current levels $i_1$ and $(i_2+i_2)$ described above. This produces the new, increased current levels $(i_1+i_3)$ and $(i_1+i_2+i_3)$, which are sent to control unit 103'.

Depending on the switching status of transistor 1025 and thus of switch 1041, input amplifier 1036' detects the voltage values corresponding to the current levels mentioned above, with the help of input resistor R:

$$U_{LOW}=R^*i_1$$

$$U_{HIGH}=R^*(i_1+i_2)$$

or $$U_{LOW}'=R^*(i_1+i_3)$$

$$U_{HIGH}'=R^*(i_1+i_2+i_3)],$$

as a function of whether excessive brake lining wear has been detected or not.

In addition to typical curve 301 previously described for the case in which additional current source 1024 is turned off, the type of signal obtained with current source 1024 turned on can be seen in the upper curve 302 of FIG. 4. Upper signal curve 302 is thus shifted with respect to lower curve 301 by the offset $(R^*i_3)$.

The desired rotational speed N of the wheel is obtained by evaluation of the frequency of these signals, shown as signal curves 301 and 302, in block 1034 of FIG. 3$b$. This rotational speed N can then be sent to the actual brake controller, drive unit controller, or other open or closed-loop controller. In the case of an open or closed-loop controller for the brakes or the drive unit, wheel brakes 11$a$–$d$ are actuated (signals 14$a$–$d$) as a function of the detected rotational speeds. Frequency evaluator 1034 is designed in such a way that the frequencies of signal curves 301, 302 are determined independently of the above-cited offset produced by the switch position of switch 1041. As a result of, the rotational speed will always be detected, i.e., regardless of whether or not excessive brake lining wear is detected. This is important in terms of system availability.

Signals 301, 302 are sent not only for evaluation 1034 mentioned above for evaluation of the rotational speeds of the wheels but also for a threshold comparison 1032. This threshold comparison 1032 serves to determine whether or not the offset $(R^*i_3)$ caused by the position of switch 1041 is present. On the output side of threshold comparison 1032 there is therefore a signal available which provides information on whether or not excessive brake lining wear is present. This information can be sent via display 110 to the driver of the vehicle.

It can be provided in particular that threshold comparison 1032 represents a standard test of the input thresholds of an input amplifier to see if a short circuit is present. This test responds to an increase in the conventional signal 301 (signal without recognized brake lining wear) by the offset $(R^*i_3)$.

This embodiment has the advantage that no changes need to be made to the hardware of the control unit or its input amplifier in comparison with a system without brake lining wear detection. It must be guaranteed, however, that it is possible for the system to distinguish between recognized brake lining wear [offset $(R^*i_3)$] and a short circuit.

This can be achieved by providing the input amplifier with a test mode. By means of this test mode, the software in the control unit can tell whether a "genuine" short circuit is present or whether brake lining wear has been detected. In addition, it is extremely unlikely that brake lining wear would occur simultaneously at all wheels of the vehicle.

Figure 3A:
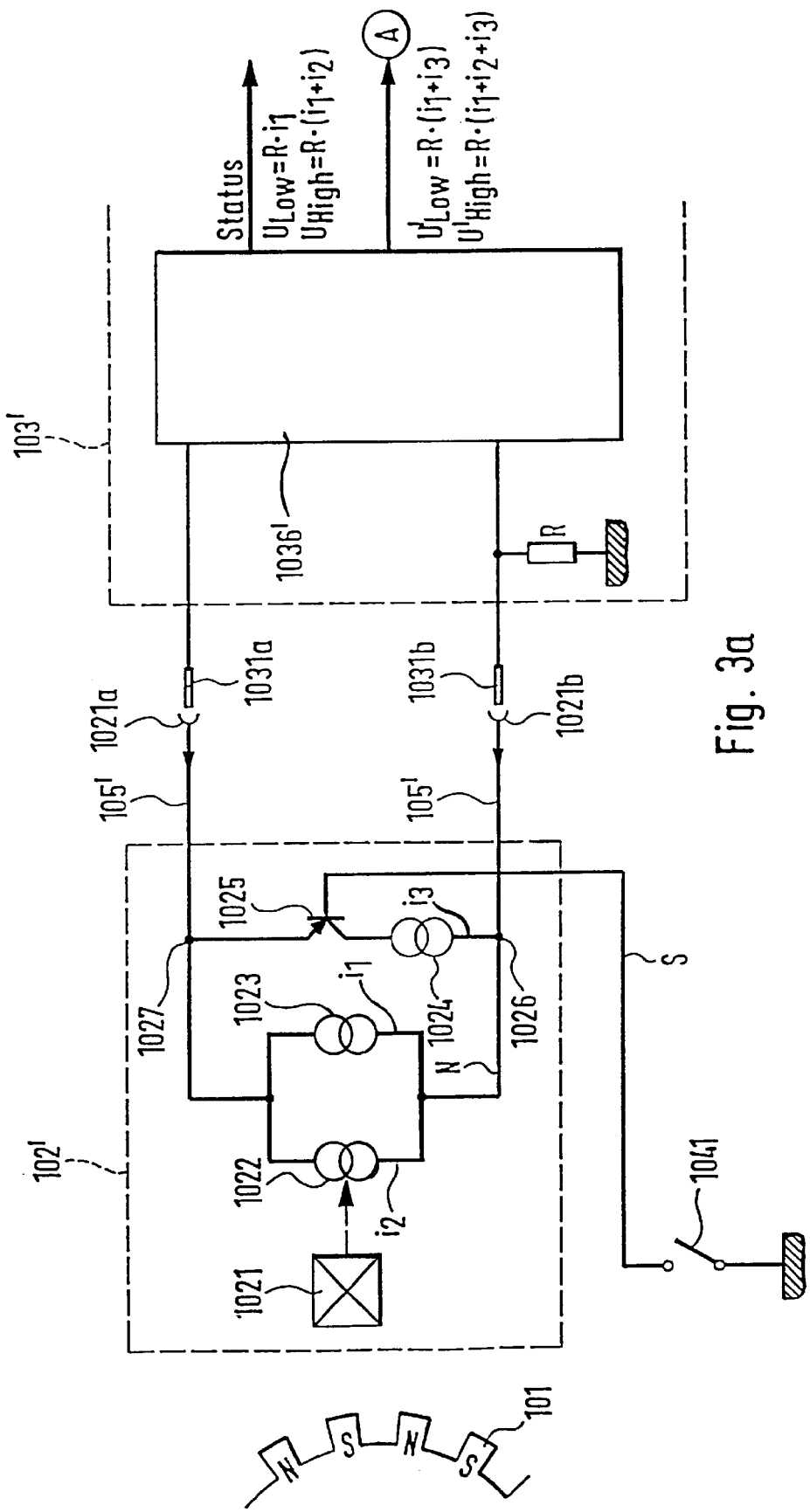
FIGS. 3a and 3b show a circuit design of a first design variant of the system according to the invention in the case where brake lining wear is detected.
Figure 3B:
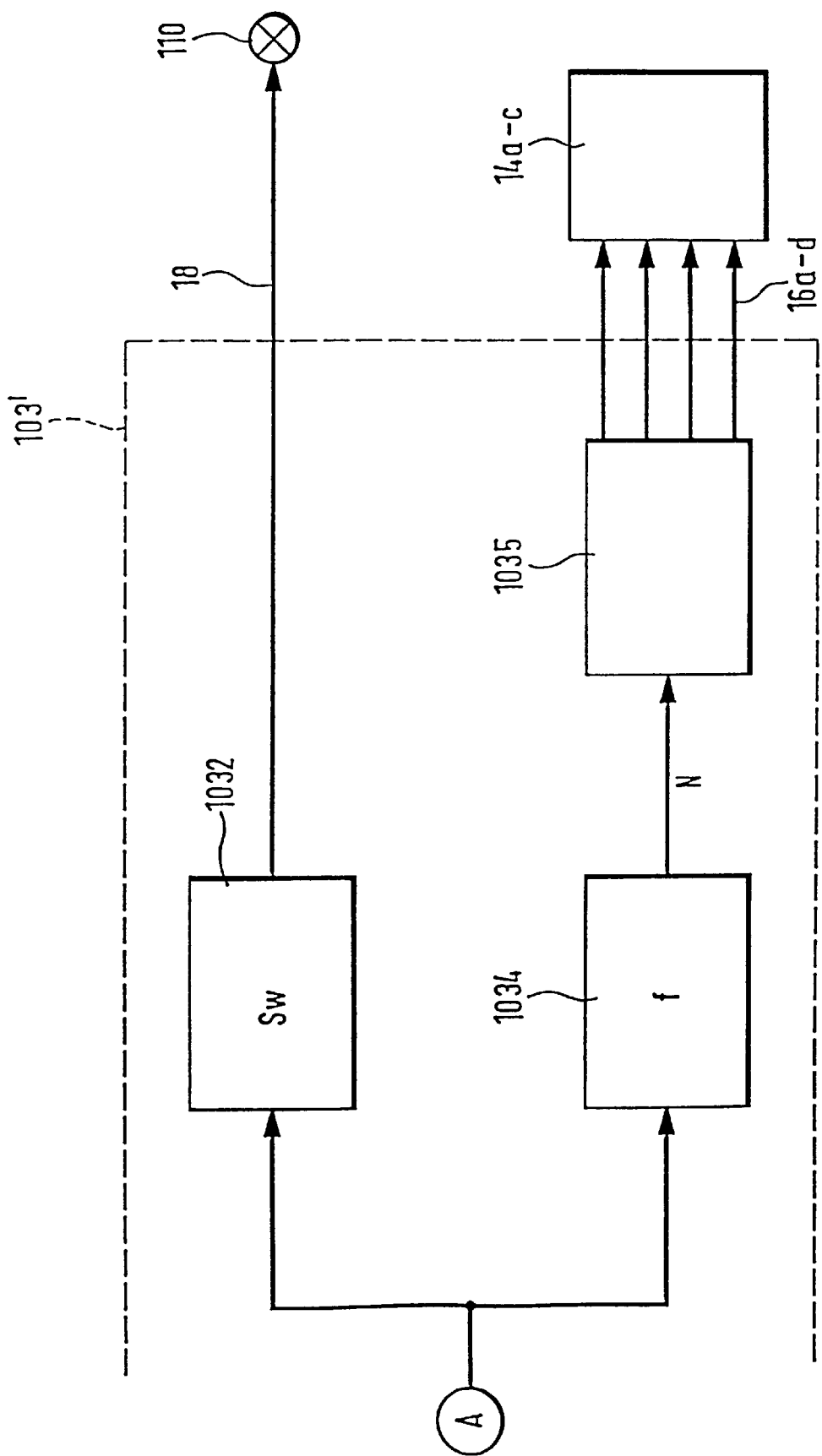

As already mentioned, the rotational speed sensor described in FIG. 3a on the basis of unit 102 in FIG. 2, additional current source 1024, and transistor 1025 are shown combined into a unit 102'. The particular goal here is to combine the rotational speed and brake lining wear detection functions by means of an integrated type of design. Signal S of switch 1041 located near the brake lining will then be sent to a component such as this, which will usually be installed near the rotational speed sensor, i.e., in the area of incremental rotor 101.

Figure 5:
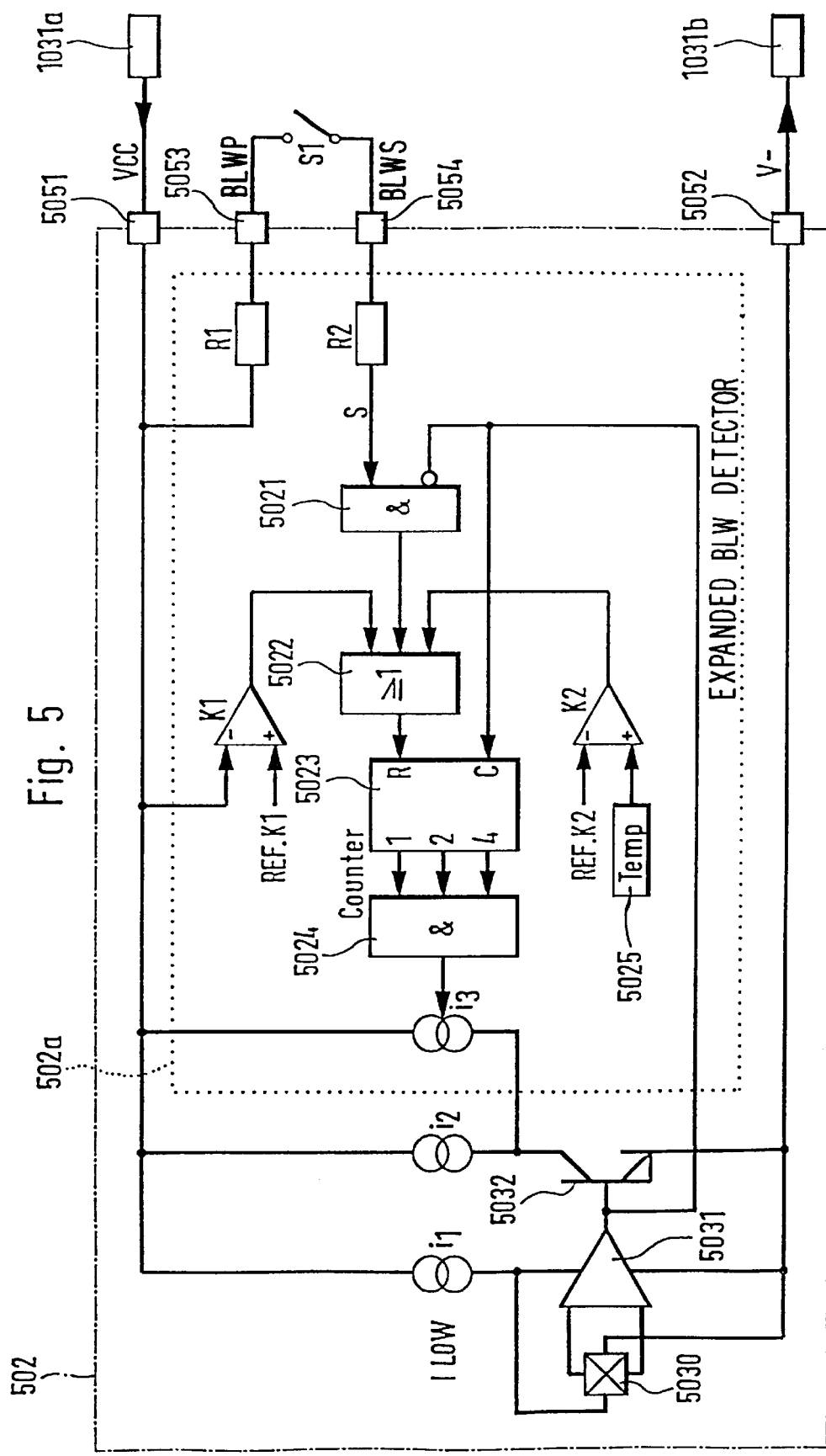

FIG. 5 shows a second design variant of the invention. Here reference number 502 designates a unit which, like unit 102' described above, combines the actual rotational speed detector and some of the components used to determine brake lining wear. Unit 502 is connected by way of lines 5051, 5052 to inputs 1031a, 1031b of a control unit, not shown in FIG. 5. This control unit is explained further below in greater detail on the basis of the block circuit diagram of unit 103' shown in FIGS. 3a and 3b. In addition, unit 502 is connected by terminals 5053, 5054 to a brake lining switch S1 (corresponding to switch 1041 of FIGS. 2 and 3a). In this exemplary embodiment, switch S1 is closed in the normal case (brake lining wear not severe enough to warrant a message).

The actual detection of the rotational speed is achieved in a manner similar to that described on the basis of FIGS. 2 and 3a. Namely, an "active" rotational speed sensor, e.g., a known Hall rotational speed sensor or a known magnetoresistive rotational speed sensor is provided. It can be seen schematically in FIG. 2 in this regard that a sensor element 1021 samples an incremental rotor 101 of a magnetically passive type. Depending on the sampled increments of rotors 101, sensor element 1021 sets two current levels $i_1$ and $i_2$. This is shown in FIG. 2 as the turning on and off of current source $i_2$, i.e., 1022. FIG. 5 shows a different view of the same rotational speed detection system. Incremental rotor (101 in FIGS. 2 and 3a) is not shown here, and the sensor element (1021 in FIGS. 2 and 3a) is designated by reference numbers 5030, 5031. Current source $i_2$ (high level) is turned on here by the switching of transistor 5032. Block 5030 is intended to represent a sensor circuit known in and of itself in the form of a Wheatstone bridge, by means of which current source $i_2$ is turned on or off by operational amplifier 5031 and transistor 5032. By means of the evaluation described on the basis of FIGS. 2 and 3a–b, the rotational speed signal is thus obtained, as shown by the lower signal curve in FIG. 4 and also in FIG. 6a. The essence of this design variant is the design of the expanded brake lining wear detector (expanded BLW detector) 502a.

When the brake lining has been worn down to a certain degree, switch S1 opens. When switch S1 is opened, a low level signal passes to the upper input of a logical AND gate 5021 shown in FIG. 5; when switch S1 is closed, this input of AND gate 5021 has a high level. The drive signal of transistor 5032 is sent in inverted form to the lower input of logical AND gate 5021. This means that, when transistor 5032 is actuated (current source $i_2$ turned on, rotational speed signal at high level), a low level (inverted) is present at logical AND gate 5021. When current source $i_2$ is turned off by the transistor (low level at transistor 5032), a high level is present at the lower input of AND gate 5021 as a result of the inversion. There is then a high level present at the output side of AND gate 5021 when the degree of brake level wear does not warrant a warning display (switch S1 closed, upper input of the AND gate at high level) and simultaneously current source $i_2$ is turned off. Otherwise, the output of the AND gate is at the low level.

The output of AND gate 5021 is connected to the input of logical OR gate 5022. Comparators K1 and K2, furthermore, are connected to the other two inputs of OR gate 5022.

Comparator K1 compares the input voltage $V_{CC}$ of sensor unit 502 with a presettable threshold value REF.K1. This is done to detect undervoltages, which can impair the proper operation of unit 502. If such an undervoltage occurs, that is, if $V_{CC}$ is smaller than REF.K1, a high level is applied to the upper input of OR gate 5022. Otherwise, this input remains at the low level.

Comparator K2 compares the temperature detected by temperature sensor 5025 with a presettable threshold value REF.K2. Temperature sensor 5025 measures the temperature to which sensor unit 502 is exposed. Temperature sensor 5025 can be, for example, a diode, the temperature-dependent forward voltage of which is measured, and can be integrated in a manner known in and of itself directly into integrated circuit (IC) of sensor unit 502. The background of this temperature measurement is that sensor unit 502 is usually mounted close to the wheel and therefore close to the brake disks as well. The heat emitted by the brake disks can heat up sensor unit 502 to such a degree that the proper operation of unit 502 can be impaired. If such overheating occurs, i.e., if the measured temperatures are greater than REF.K2, a high level is applied to the lower input of OR gate 5022. Otherwise, this input remains at the low level.

On the output side of OR gate 5022, there is therefore a high signal when at least one of the three inputs is at the high level, when, therefore:

either sensor unit 502 is overheated or an undervoltage is present or brake lining wear severe enough to warrant a warning message is not present and simultaneously current source $i_2$ is turned off.

Otherwise, the output of the OR gate is at the low level.

The output of OR gate 5022 is connected to a reset input R of a counter 5023. Counter 5023 is set back when there is a high signal at the R input. Clock input C of counter 5023 is connected to the drive signal for transistor 5032. Input C thus receives a high level when current source $i_2$ is turned on and a low level when current source $i_2$ is turned off. Counter 5023, which is designed in a manner known in and of itself as a flip-flop switch, is therefore always switched when current source $i_2$ is turned on or off. Counter 5023 has three outputs, which have a high level when the level at clock input C has changed the first, second, and fourth time from low to high. In this way it is achieved that, when current source $i_2$ has been turned on the fourth time, three high levels are present at AND gate 5024, to which the outputs of counter 5023 are sent. In this case (all three inputs of AND gate 5024 at high), the AND gate also supplies a high level on the output side, whereupon the third current source $i_3$ is turned on. Current $i_3$ of current source $i_3$ is then superimposed on the current $(i_1+i_2)$ present at this time, which leads to a total current of $(i_1+i_2+i_3)$ at output 5052. The turning on of current source $i_3$ can occur by means of a transistor, not shown in FIG. 5, connected in series with this current source $i_3$. This would be done in a manner similar to that shown in FIG. 3a, where current source $i_3$ is turned on and off by transistor 1025.

FIG. 6a shows the signal present at output 5052 when switch S1 is closed (brake lining wear not severe enough to warrant a warning message). The upper input of AND gate

5021 shown in the lower signal curve of FIG. 6a is then set to high. By means of OR gate 5022, counter 5023 (input R) is always reset when current source $i_2$ is turned off. In this way, it is ensured that the third current source $i_3$ does not remain turned off when the brake lining wear is not severe enough to warrant a warning message. In control unit 103' (input 1031b), the signal present at output 5052 is then converted by way of resistor R into a voltage, whereupon, by means of the frequency analysis 1034 already described, the rotational speed N of the wheel is determined.

FIG. 6b shows the course of the signal present at output 5052 when switch S1 is open (brake lining wear severe enough to warrant a warning message). The upper input of AND gate 5052 shown in the lower signal curve of FIG. 6b is then set to low. By means of OR gate 5022, counter 5023 (input R) is reset only when an undervoltage (comparator K1) or an excessive temperature (comparator K2) is present. In the normal case (neither undervoltage nor excessive temperature) input R of counter 5023 remains at low, whereupon, every fourth time current source $i_2$ is turned on, current source $i_3$ is turned on. This produces the rotational speed signal shown in the upper part of FIG. 6b. In control unit 103' (input 1031b), the signal present at output 5052 is then converted by way of resistor R into a voltage, whereupon, by means of the previously described frequency analysis 1034, the rotational speed N of the wheel is determined. In addition, threshold comparison 1032 determines whether or not level $R*(i_1+i_2)$ has been exceeded. In the case of brake lining wear severe enough to warrant a warning message, this is based on the increase in the fourth high level of the rotational speed signal and is displayed by display means 110.

Figure 7:
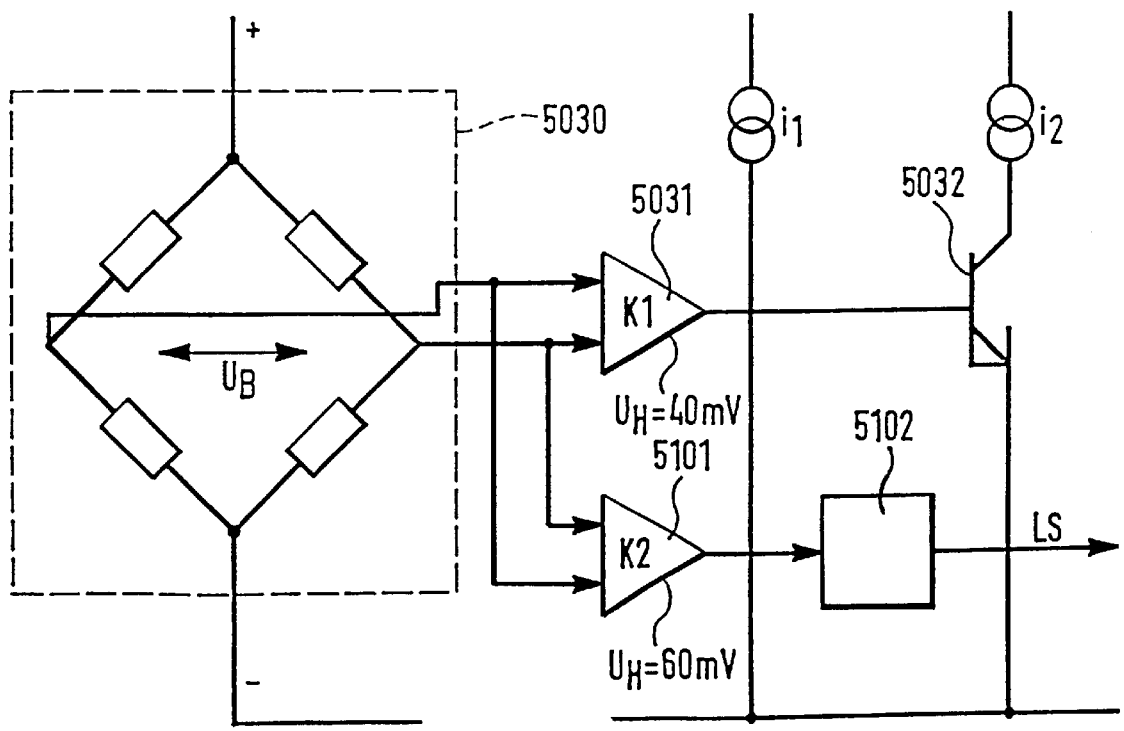
FIGS. 7, 9a, and 9b show by way of example how an excessive air gap and the rotational direction of the wheel are detected, the associated signals being shown in FIGS. 8, 10a, and 10b.

By way of example, FIG. 7 shows how, according to another design variant of the invention, an excessive distance between a Hall or magnetoresistive sensor and the previously described toothed wheel rim of the vehicle wheel, the rotational speed of which is to be detected, can be determined. Sensor element 5030 is the sensor element designated by the same reference number in FIG. 5. As already mentioned in that context, element 5030 is a known Wheatstone bridge with a typical ring-shaped arrangement of resistors. As the individual segments of the toothed wheel rim (not shown) pass by, a bridge voltage $U_B$ is produced in this Wheatstone bridge, and this voltage is sent to comparators 5031, 5101. Comparator K1 corresponds to the comparator designated by the same reference number in FIG. 5 and serves to evaluate the rotational speed of the wheel. Comparator K2 5101 evaluates the bridge voltage in another way; that is, the bridge voltage is compared with a relatively high threshold value $U_H$. The background of the two threshold comparisons will be discussed in the following in connection with FIG. 8.

Figure 8:
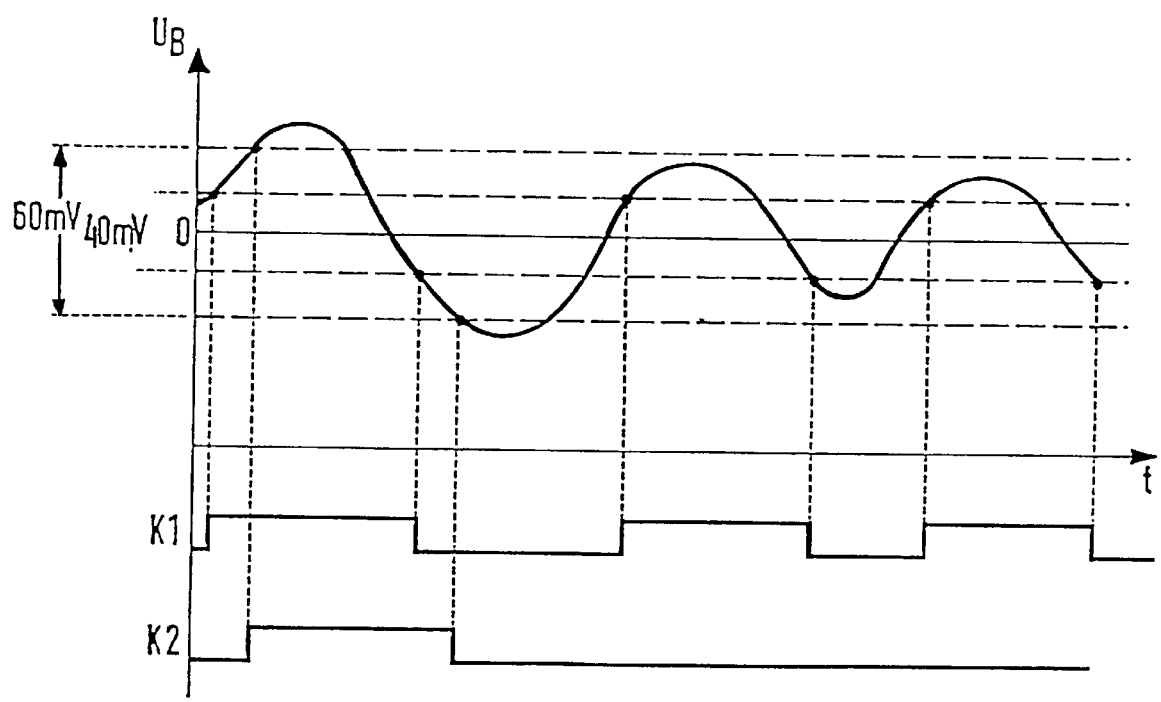

FIG. 8 shows a typical signal course of the bridge voltage over time. Depending on the rate at which the individual segments of the toothed wheel rim pass by, the bridge voltage increases and decreases periodically. If the distance, i.e., the air gap, between the toothed wheel rim and the Wheatstone bridge 5030 remains constant, the bridge voltage has a constant amplitude. If this distance become too large, however, the amplitude of the bridge voltage decreases. This case is shown in FIG. 8.

A first threshold comparison in comparator 5031 compares the bridge voltage signal with a relatively low threshold value such as 40 mV. On the output side, comparator 5031 supplies the drive signal for current sources $i_1$ and $i_2$, shown by the lower signal curve K1 in FIG. 8 (see FIG. 5). Signal K1 therefore represents the rotational speed of the wheel, even when the air gap is increasing. Comparator 5101 also checks the amplitude of the bridge voltage signal, but in this case a relatively high comparison threshold of 60 mV, for example, is used. If the distance between the toothed wheel rim and the Wheatstone bridge, i.e., the air gap, is sufficiently small, the amplitude of the bridge voltage signal is above the threshold of comparator 5101. As can be seen from the lower signal curve K2 in FIG. 8, under proper conditions the output signal of comparator 5101 is characterized by a time delay in signal K2 with respect to signal K1. But if the signal from comparator signal K2 disappears completely, this means that the amplitude of the bridge voltage signal has decreased and that the air gap is too large.

The absence of signal K2 is detected in unit 5102, where an absence of signal K2 results in the generation of a signal LS.

In summary, it can be said with respect to the detection of the air gap that an active sensor such as a Hall sensor or a magnetoresistive sensor is used to detect the rotational speed signals of a wheel. The sensors contain a Wheatstone bridge, which is detuned by changes in the magnetic field. The signal for the rotational speed is obtained from this detuning. The extent of the detuning stands in a fixed relationship to the magnitude of the differences between the magnetic fields of the two halves of the bridge. The magnetic field difference depends on, among other things, the distance between the sensor and the pole wheel. By evaluation the extent of the bridge detuning, it is possible to draw a conclusion concerning the size of the air gap between the sensor and the pole wheel. This evaluation can be carried out with comparator 5101, which has a greater hysteresis ($U_H$=60 mV) than normal useful-signal comparator 5031 ($U_H$=40 mV). If the air gap is small, both comparators connect through, but if the air gap is too large, only useful-signal comparator 5031 connects through. In this way, an early warning system for an excessive air gap is obtained, without any loss of data pertaining to the rotational speed of the wheel. This information can be used, for example, for end-of-line monitoring during the manufacture of motor vehicles, in the repair shop, or while driving.

Figure 9A:
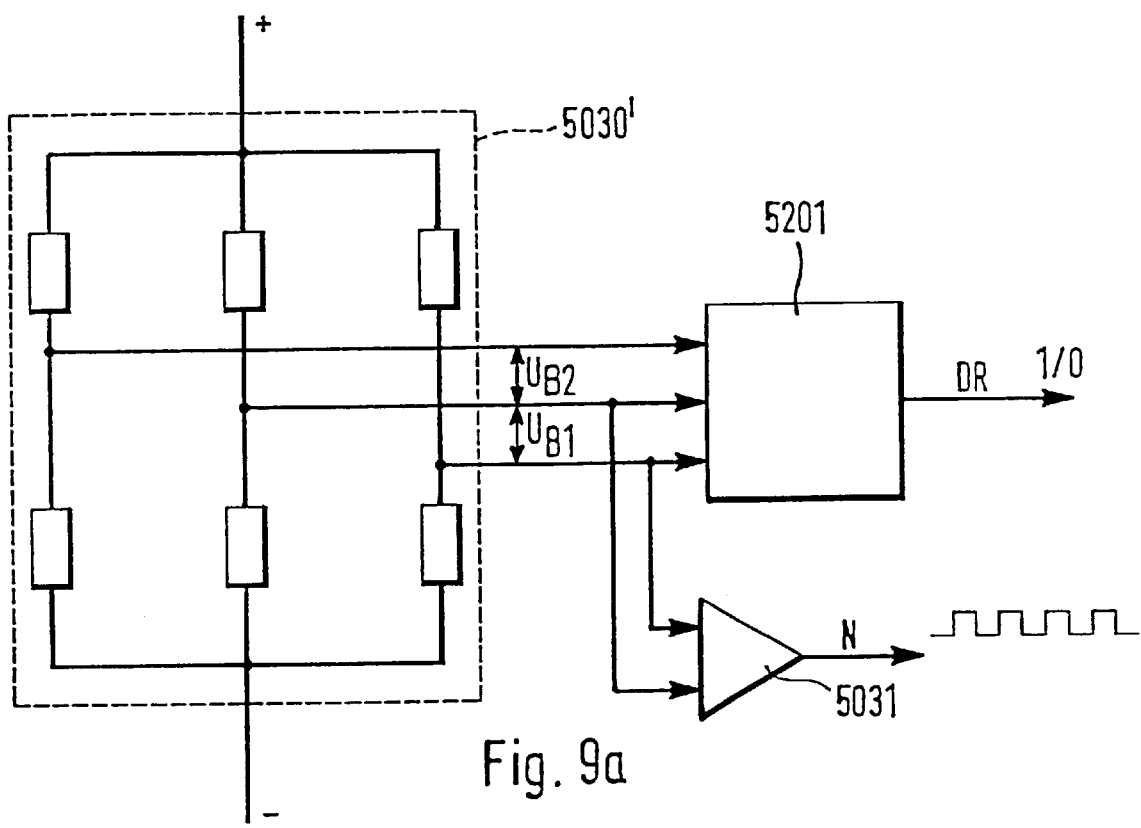
Figure 9B:
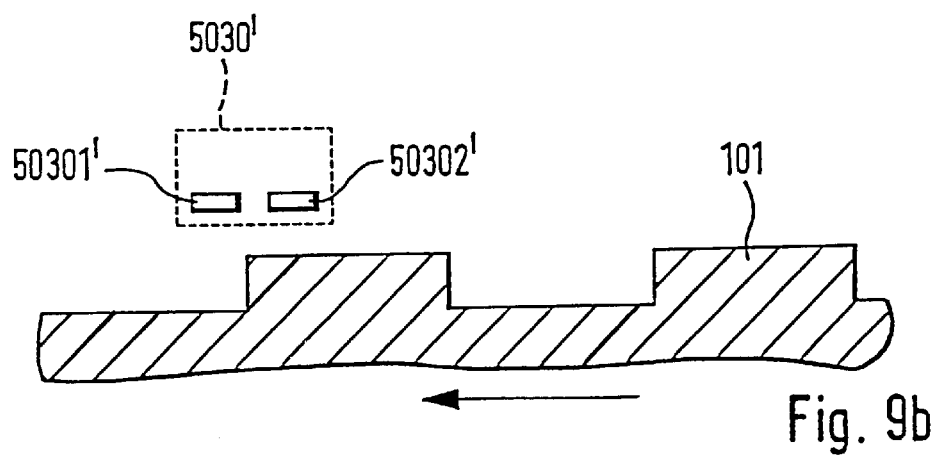
Figure 10A:
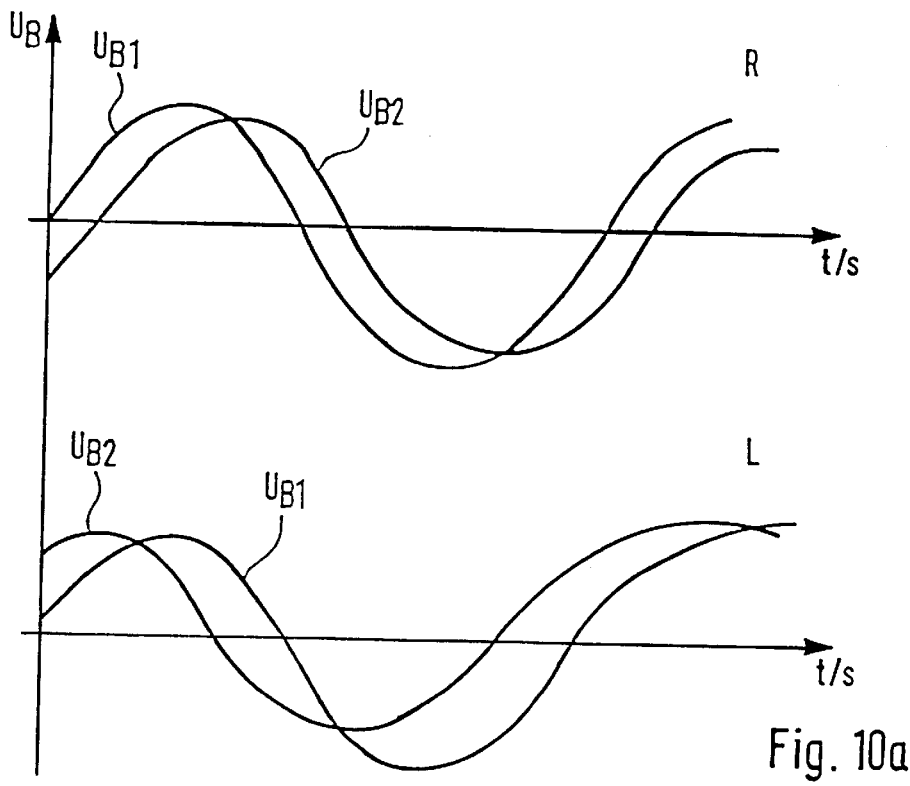

FIGS. 9a and 9b show by way of example the evaluation carried out to identify the direction of rotation of a wheel. For this purpose, FIG. 9a shows a Hall or magnetoresistive sensor 5030', which has been modified with respect to the sensors shown in FIG. 7 and FIG. 5. The modification consists in that the known Wheatstone bridge, as can be seen in FIG. 9a, is expanded by two additional resistors. Instead of this modified Wheatstone bridge, it is also possible for a modified Hall or magnetoresistive sensor to have two separate sensing elements 50301' and 50302' or to provide two complete Wheatstone bridges (FIG. 9b). Here, too, the individual elements of the toothed wheel rim, pole wheel, or transmitter wheel (101, FIGS. 2, 3a, and 9b) to produce corresponding changes in the bridge voltage signals $U_{B1}$ and $U_{B2}$. These bridge voltage signals are sent to evaluation unit 5201. Simultaneously, at least one of the bridge voltage signals is sent for evaluation of the useful signal to comparator 5031, described previously (FIGS. 5, 7, 8). The function of rotational direction detector 5201 is explained below on the basis of FIGS. 10a and 10b.

Figure 10B:
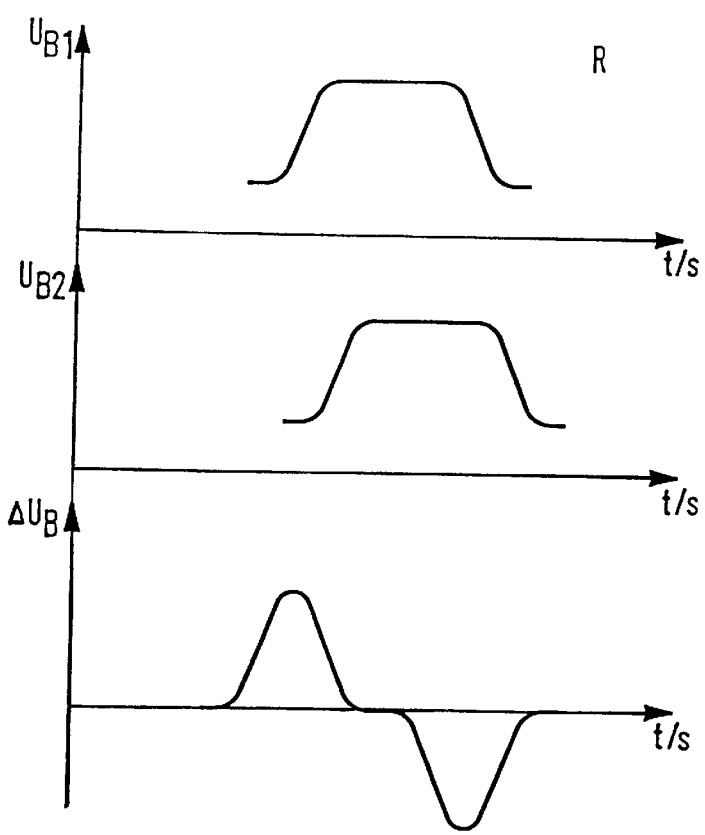

FIGS. 10 and 10b show the course of the bridge voltage signals of the bridge shown in FIG. 9a. Either the change over time t, the change over distance s, or the change over the rotational angle of the transmitter wheel can be considered. Depending on the direction in which the wheel is rotating, either the right part of modified Wheatstone bridge 5030' is detuned first or the left part. When the wheel is turning toward the right, bridge voltage $U_{B1}$ precedes bridge voltage $U_{B2}$, whereas the situation is reversed when the wheel is rotating toward the left. Rotational direction evaluator 5201 evaluates the phase shift of the two bridge voltage curves, and a signal DR is generated when the wheel is turning backwards. As an alternative, it is also possible, as can be seen in FIG. 10b, for the difference $\Delta U_B$ between the two bridge voltage values $U_{B1}$ and $U_{B2}$ to be formed. The information DR concerning the direction of rotation (forwards/backwards) is obtained from the change in this difference $U_B$, especially from the positions of the maxima and minima (peaks pointing "up" or "down").

Figure 11:
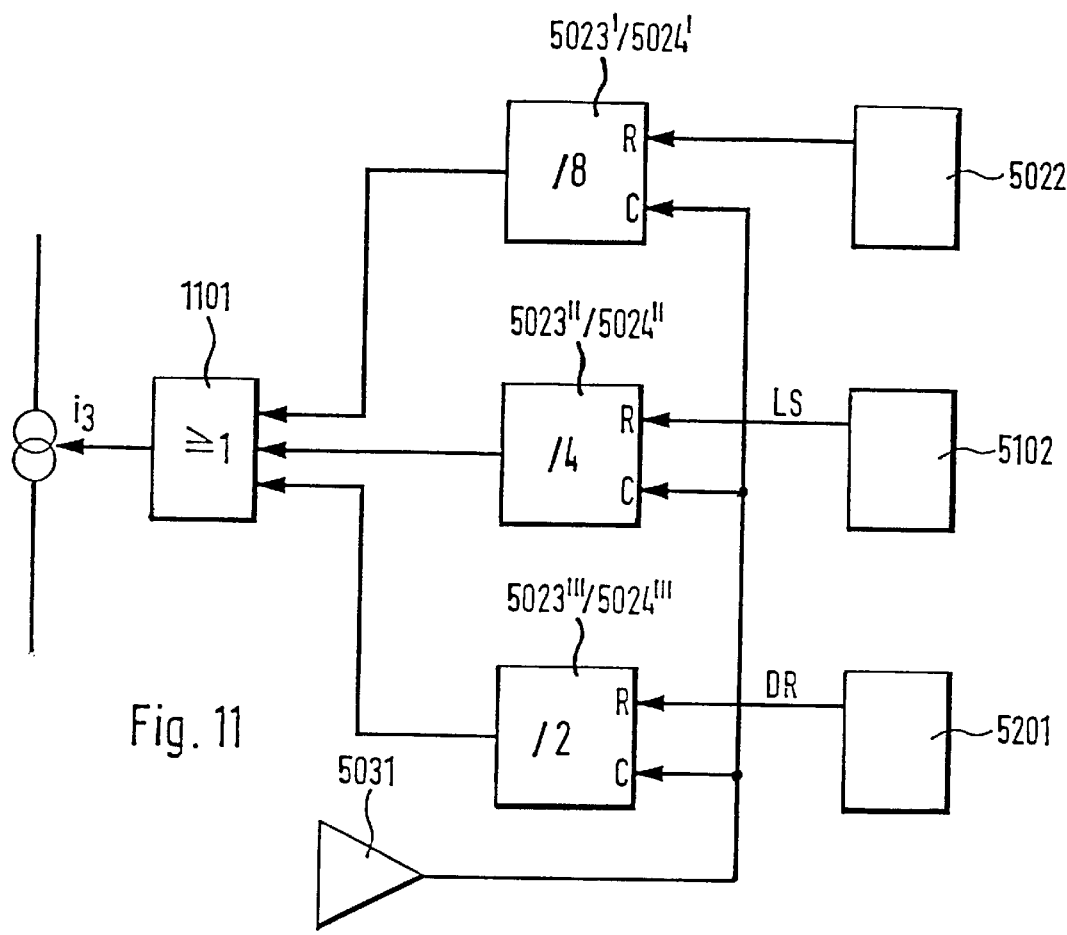
FIGS. 11 and 12 show additions to the circuit designs shown in FIGS. 5 and 3b, while the signal courses are shown in FIG. 13.

FIG. 11 shows an expansion of FIG. 5. Whereas FIG. 5 has as its object the transmission of the rotational speed signal of the wheel and the brake lining wear signal to control unit 103, the goal of the expansion in FIG. 11 is to transmit a rotational direction signal DR, an air gap signal LS, and a brake lining wear signal BLW. For this purpose, as the output signal of unit 5022 (FIG. 5), the brake lining wear signal BLW, which represents excessive brake lining wear, is sent as input to counter 5023', 5024'. The output signal LS of air gap detector 5102 is sent as input to counters 5023", 5024", whereas output signal DR of rotational direction detector 5201 is sent as input to counters 5023''', 5024'''. The three counters are synchronized by the output signal of comparator 5031 (FIG. 5). What occurs therefore is that the counters are synchronized with the rotational speed of the wheel.

Figure 13:
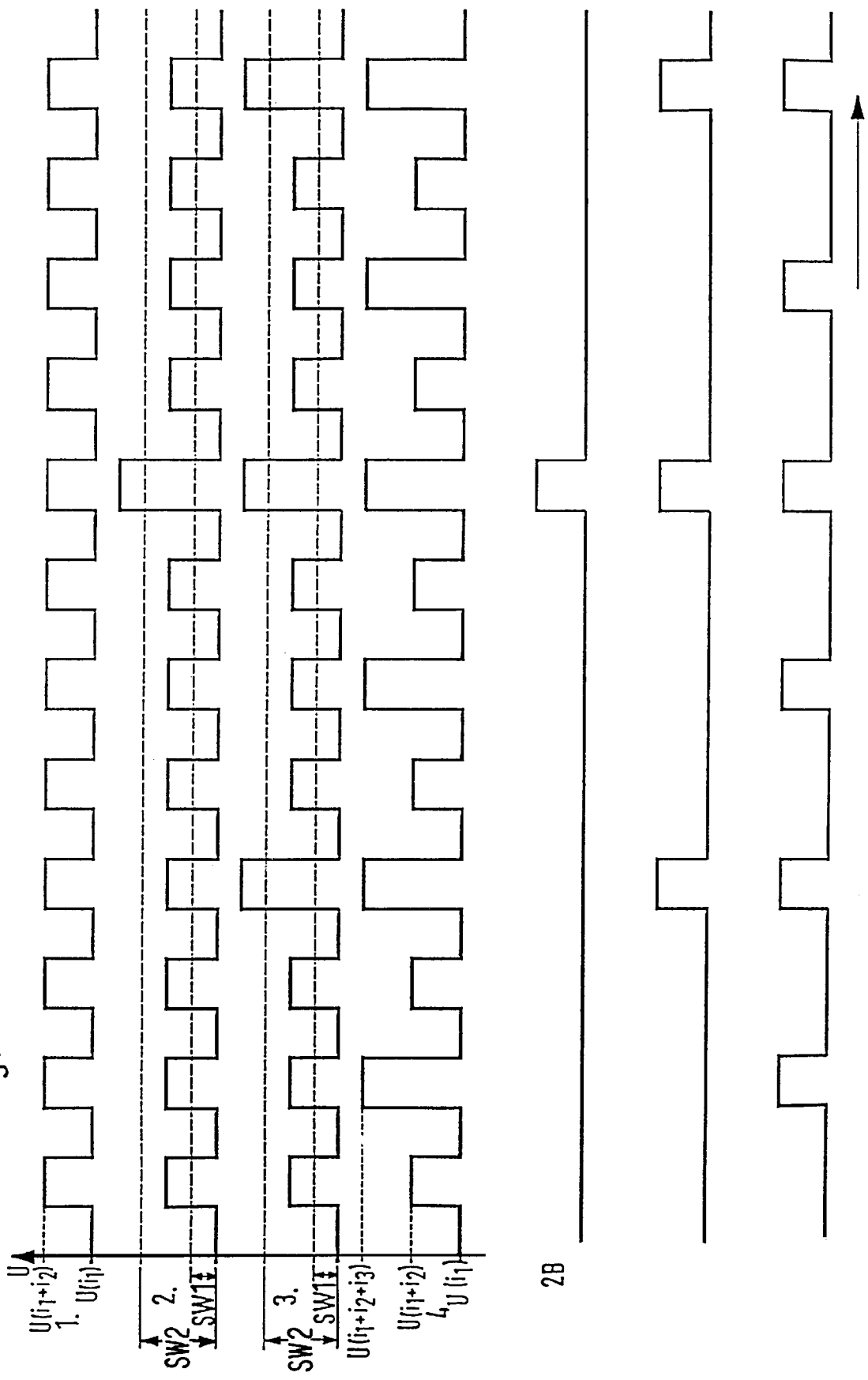

The three counters shown in FIG. 11 differ in that they carry out a division by 8, by 4, and by 2. On the output side, all 3 counters are connected to the input of logical OR gate 1101. The additional current source $i_3$ (FIG. 5) is driven by the output of OR gate 1101. FIG. 13 must now be described in order to show how the circuit in FIG. 11 functions.

Figure 12:
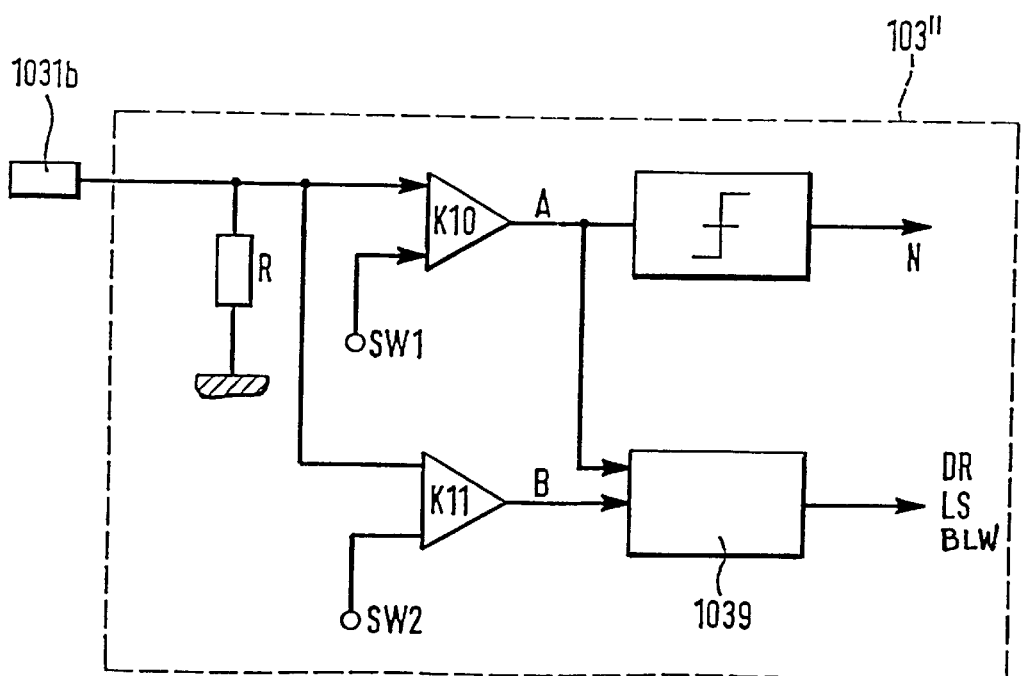

In the upper part of FIG. 13 (signal 1), we see the wheel rotational speed signal normally present at output 5052 (FIG. 5) of the sensor element, that is, the signal without any additional information superimposed on it. If now, according to FIG. 5, for example, an excessive degree of brake lining wear is detected (unit 5022) signal BLW causes every eighth high level of the wheel rotational speed signal to be increased by means of the counters 5023', 5024'. This can be seen in the second signal of FIG. 13. If the air gap is too large, every fourth high level is increased by means of the corresponding counter, as shown in the third signal n FIG. 13. In the same way, the detection of backwards travel brings about an increase of every second high level of the wheel rotational speed signal (fourth signal in FIG. 13). The wheel rotational speed signal (signal 1 in FIG. 13) or the modified wheel rotational speed signal (signals 2, 3, 4 in FIG. 13) are present at the output 5052 (FIG. 4) of sensor element 502. This signal is sent to control unit 103, where the evaluation shown in FIG. 12 takes place.

Via input plug 1031b, the input signal is converted via precision resistor R into a corresponding voltage value. In a first comparator K10, the signal is compared with a relatively low threshold value SW1. This threshold value, as can be seen in FIG. 13, is selected to be so low that it is exceeded by the high level of the normal (not increased to the high level) rotational speed signal ($i_1+i_2$), i.e., its corresponding voltage value. The wheel rotational speed signal is then present at output A independently of the increase in the high level according to the invention and can be evaluated in frequency evaluator f to obtain the rotational speed N of the wheel. Simultaneously, the voltage values are also sent to comparator K11, where the voltage signal is compared with a relatively high threshold value SW2. As can be seen in FIG. 13, only a high level which has been increased according to the invention exceeds this high threshold value SW2. Depending on the presence of information (backwards travel, air gap too large, excessive brake lining wear), we thus arrive at signals 2B (evaluation of the second signal curve), 3B (evaluation of the third signal curve), and 4B (evaluation of the fourth signal curve), shown in FIG. 13, at the output of comparator K11. Signal curves B are evaluated in evaluation unit 1039.

In regard to evaluation unit 1039, it should be remarked that, in the presence of backwards travel (signals 4, 4B in FIG. 13), every second high level is raised. We thus arrive at a signal 4B, which has half the frequency of rotational speed signal A. By a comparison of output signal B of comparator K11 with rotational speed signal A of the wheel in evaluation unit 1039, the conclusion is drawn that, for example, in the case shown in FIG. 13 by signal 4B, the vehicle is traveling backwards. This information can be made available as an output signal of evaluation device 1039 and used for a wide variety of additional data processing applications. Information of this type with respect to backwards travel is extremely helpful to so-called "hill holders", for example, and navigation systems.

Whereas backwards travel can be clearly detected, the embodiment does not make it possible to determine, while the vehicle is traveling backwards, whether or not an excessive air gap and/or excessive brake lining wear is present. Only after the vehicle has stopped traveling backwards and signal curve 3B, for example, is present at evaluation unit 1039, can it be concluded, by means of an appropriate frequency comparison with rotational speed [signal] A, that either an excessive degree of brake lining wear or an overly large air gap is present. Because a vehicle usually travels backwards for only a relatively short period of time, whereas an excessive air gap or an excessive degree of brake lining wear occurs simultaneously and spontaneously only in the rarest of cases, the superimposition of the information in this design variant does not represent a problem. After backwards travel has ended, a comparison of wheel rotational speed frequency A with the frequency of signal 2B will reliably determine whether or not an excessive degree of brake lining wear is present. If signal 3B occurs, however, then again a frequency comparison will show whether or not an excessive air gap is present.

The basis of the exemplary embodiments described so far has been the detection of the rotational speed of a wheel of a vehicle (as already mentioned, the invention can also be used to determine the rpm's of an engine), where at least two current levels $i_2$ and $i_2$ are generated by means of a so-called "active" sensor. At least one of these current levels is then changed by a third current level $i_3$ so that additional data (brake lining wear, air gap, direction of rotation) can be transmitted. In these variants, the current levels are transmitted from sensor unit 502 (FIG. 5) to control unit 103' (FIG. 3). This offers the advantage that only a two-wire connection is required between sensor unit 502 and control unit 103'. Nevertheless, these variants lead to a certain power dissipation, especially when the third current source $i_3$ is turned on.

Against this background, a variant is described in the following, in which the information, especially the rotational speed and direction of rotation, are sent by different voltage levels from sensor unit 502 to control unit 103'. Although a three-wire connection (voltage supply, ground, signal line) is required between sensor unit 502 and control unit 103', this variant has certain advantages with respect to the power dissipation mentioned.

Figure 14:
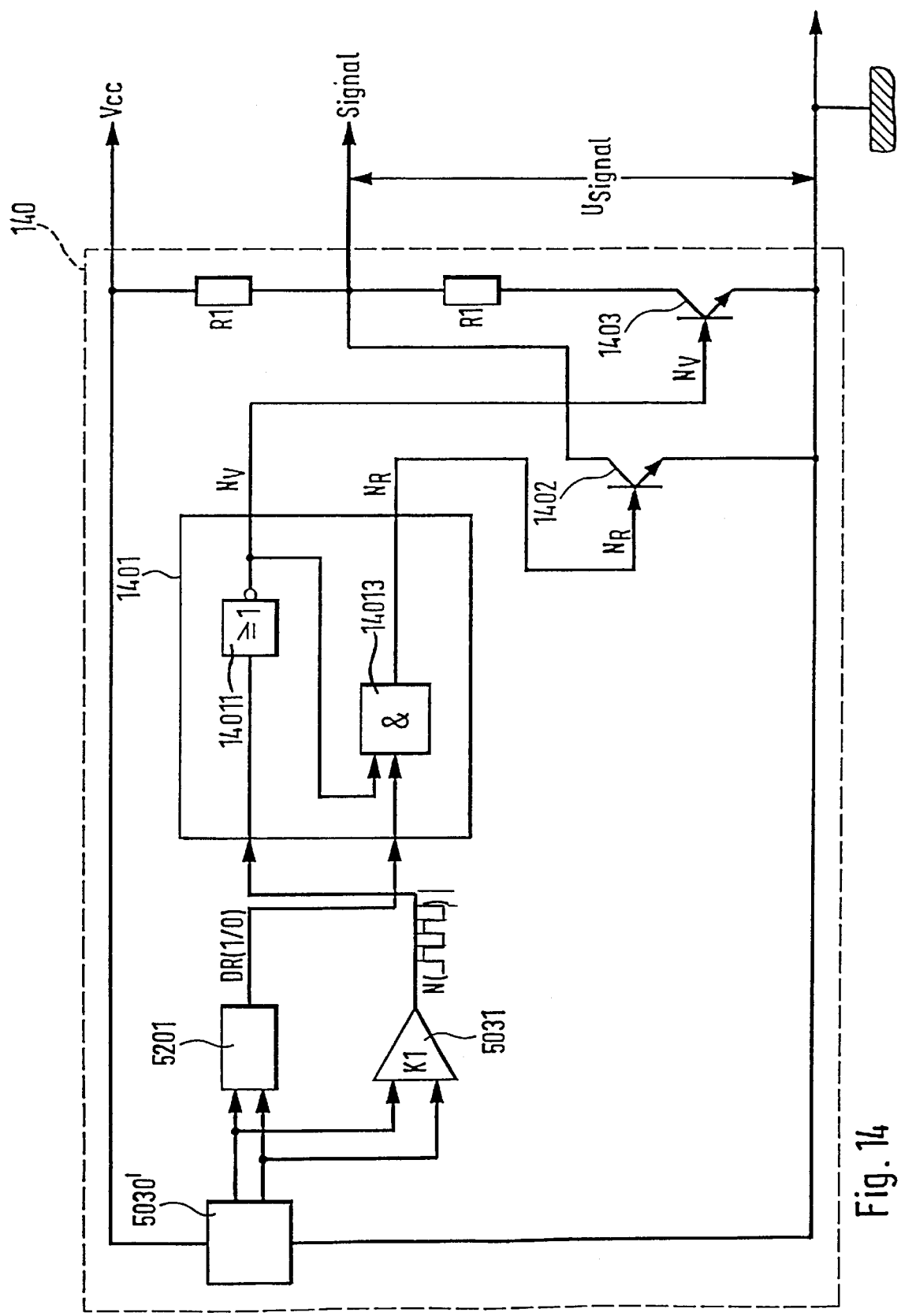
FIGS. 14 and 15 show an additional design variant of the invention, the courses of the signals being shown in FIG. 16.

FIG. 14 shows a sensor unit 140, in which a rotational speed signal N and a rotational direction signal DR are generated by means of previously described sensor 5030' (FIGS. 9 and 10), comparator 5031 (FIGS. 5, 7, and 9a), and rotational direction detector 5201 (FIGS. 9 and 10). These two signals are shown at the top 2 in FIG. 16. Both rotational speed signal N and rotational direction signal DR have two voltage levels "0" and "1"; the frequency of rotational speed signal N indicates the rpm's of a wheel of the vehicle, the rpm's of the engine, or the rpm's of a transmission. Rotational direction signal DR has the voltage level "0" when the vehicle is traveling forwards or when the engine of the vehicle is rotating in the normal direction. The rotational direction signal DR has the voltage level "1" when the vehicle is traveling backwards or when the vehicle engine is rotating in reverse.

These signals are processed in unit 1401 by means of logical AND gate 14013 and inversion stage 14011, so that signals $N_V$ and $N_R$ are present at the output of unit 1401. The course of these signals can be seen as signal curves 3 and 4 in FIG. 16.

Signals $N_V$ and $N_R$ now drive transistors 1402, 1403 in such a way that a "0" level of the $N_V$ signal blocks transistor 1403 or a "1" level of the $N_V$ signal switches transistor 1403 to the conductive state. Transistor 1402 is blocked by a "0" level of the $N_R$ signal and switched to the conductive state by a "1" level of the $N_R$ signal. While transistor 1402 is in the conductive state, voltage level "0" is present on the output side of sensor unit 140, on signal line $U_{signal}$, independently of the switching status of transistor 1403. If transistor 1402 is blocked, then, depending on the rotational speed, the voltage levels $V_{CC}$ and $V_{CC}/2$ are present on the output side of sensor unit 140 on signal line $U_{signal}$, as a function of the switching position of transistor 1403, under the assumption that resistors R1 have the same rating. Level $V_{CC}$ comes about in that, when transistors 1402 and 1403 are blocked simultaneously, no more current flows and therefore there is no voltage drop at R1.

In summary, the following switching table describes the operation of sensor unit 140 (FIGS. 14 and 16):

| DR | N | $N_R$ | $N_V$ | $U_{Signal}$ |
|----|---|-------|-------|--------------|
| 0  | 0 | 0     | 1     | VCC/2        |
| 0  | 1 | 0     | 0     | VCC          |
| 1  | 0 | 1     | 1     | 0            |
| 1  | 1 | 0     | 0     | VCC          | where:

N=the rotational speed (square-wave signal from the processing circuit);

DR=the rotational direction (DR=0: forwards, DR=1: backwards, from the processing circuit);

NR=rotational speed square-wave signal for driving transistor 1402 (active only during backwards rotation, otherwise 0);

$N_V$=rotational speed square-wave signal for driving transistor 1403 (always active); and $U_{signal}$=output signal of sensor unit 140.

Figure 15:
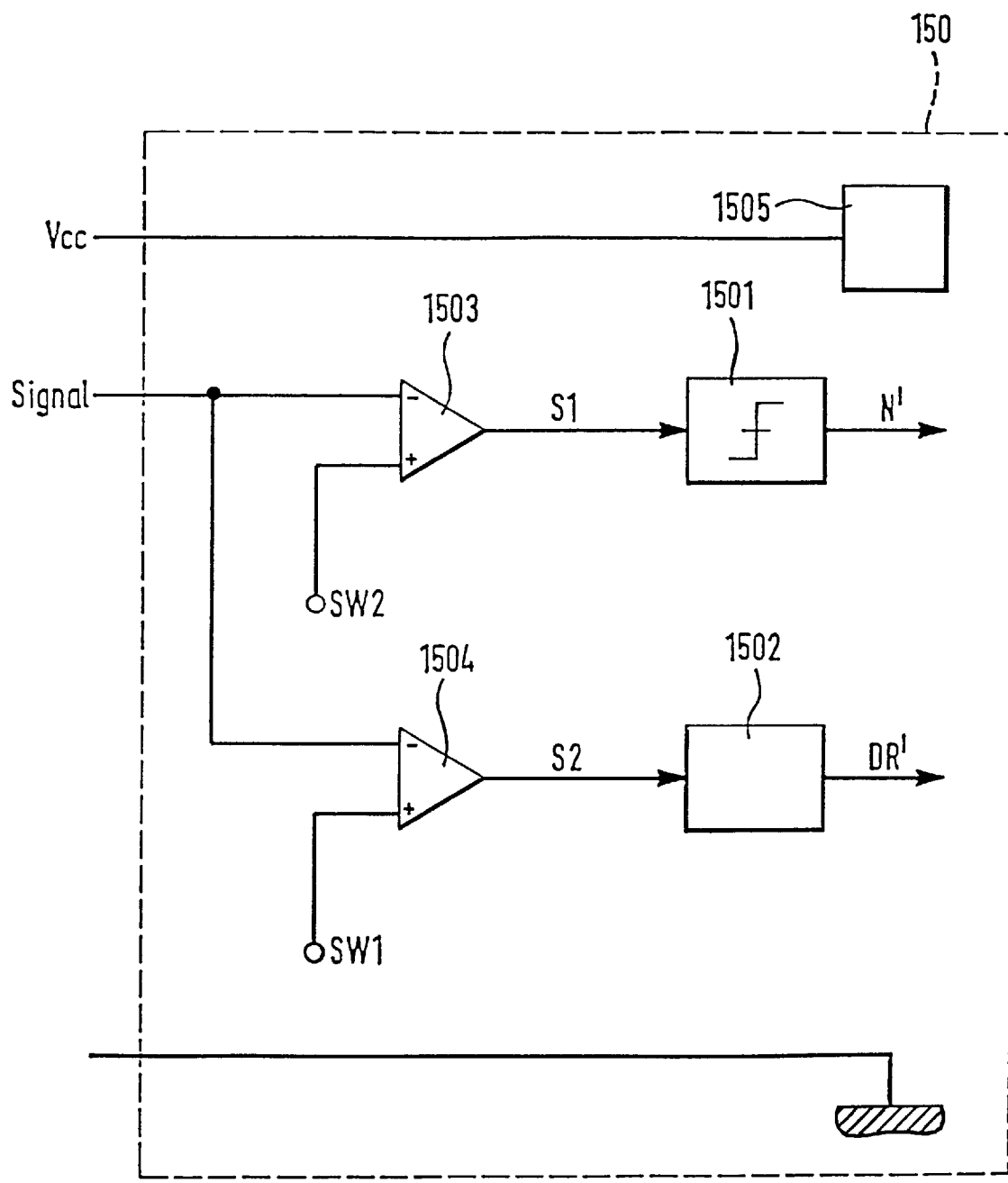

FIG. 15 shows how signal $U_{signal}$, generated in sensor unit 140, is evaluated. Supply voltage $V_{CC}$ is provided by voltage supply 1505. Signal $U_{signal}$ (signal 5 in FIG. 16) is sent to two comparators 1503, 1504, where the voltage levels are compared with two threshold values SW1, SW2. These two threshold values are drawn on signal 5 of FIG. 16. As comparison results, signals S1, S2 are available on the output side of comparators 1503, 1504; these result signals are shown as signal 6 and 7 in FIG. 16. The frequency of signal S1 can be evaluated by frequency evaluator 1501 to determine the rotational speed, whereas it is determined in unit 1502 whether signal S2 has reached the high level, from which it can be concluded that the vehicle is traveling backwards or that the engine of the vehicle is rotating backwards (information DR').

Rotational speed signal N' and rotational direction signal DR' are subjected to further processing in control unit 150.

At this point it should be pointed out that, in principle, the rotational direction signal can also be encoded. That is, instead of lowering every low level of the rotational speed signal in the event of backwards rotation (signal 5, FIG. 16), it is possible, in analogy to FIG. 13 previously described, to lower or raise every n-th signal level.

Because, in cases where it is in fact possible to detect the backwards rotation of an internal combustion engine, the idea is to detect this condition as quickly as possible, it is advantageous in this application for every level to be changed immediately once backwards rotation has been determined.

What is claimed is:

1. A system for producing a signal representing a rotational movement of a wheel on a motor vehicle having an engine, said system comprising:

a first means for generating a first signal representing the rotational movement and said first signal assuming at least two first values of current or voltage;

a second means capable of generating at least one second signal said second signal representing one or more of:
   brake lining wear in at least one wheel brake of the vehicle,
   the direction of said rotational movement,
   the amplitude of a value associated with the first signal,
   other operating conditions of the vehicle wheel,
   other operating conditions of the vehicle brake, and
   other operating conditions of the vehicle engine; and a third means capable of changing at least one of the first values of the first signal, wherein the occurrence of said change is dependent upon the generation of said second signal.

2. A system according to claim 1, wherein the system is part of a motor vehicle, and the first signal represents a rotational speed selected from the group consisting of rotational speed of a vehicle wheel; rotational speed of a motor of the vehicle, said motor being a gasoline or diesel engine or an electric motor; and rotational speed of a shaft operationally connected to a transmission of the vehicle.

3. A system according to claim 1, wherein the first means comprises an active rotational speed sensor, and the third means changes the first signal by raising at least one of the first current values for a period of time to a second current value as a function of the second signal.

4. A system according to claim 1, wherein the second means generates signals which represent at least said brake lining wear in at least one wheel brake of a vehicle, said direction of rotational movement, and said amplitude of a value associated with the first signal.

5. A system according to claim 3, wherein the third means has a current source.

6. A system according to claim 5, wherein the third means includes switching means for turning on and off the superimposition of at least one of the two first current values onto a current induced by the current source.

7. A system according to claim 5, wherein the third means includes switching means for turning the current source on and off.

8. A system according to claim 6 wherein the switching means has a first switch and a second switch, preferably designed as a transistor, and the first switch is located near a brake lining and the second switch is located near the rotational speed sensor.

9. A system according to claim 8, wherein the first switch has a switching status dependent on the degree of brake lining wear, and the second switch has a switching status dependent on the switching status of the first switch.

10. A system according to claim 3, wherein the active rotational speed sensor for generating the at least two first current values has at least two current sources.

11. A system according to claim 1, wherein a means of transmission transmits the first signal or the changed first signal to an evaluation means for evaluating the rotational movement.

12. A system according to claim 11, wherein, the evaluation means has conversion means which converts the current values of the first signal into corresponding voltage values.

13. A system according to claim 12, wherein, the evaluation means performs at least one threshold value comparison comparing the current values or the corresponding voltage values with at least one threshold value result, and wherein display means can be driven as a function of the comparison result.

14. A system according to claim 1, wherein the number of times the change of the first signal by the third means dependent on the second signal occurs is determined so that at least one of the two first current values is increased after said change has occurred a defined number of times.

15. A system according to claim 14, wherein the defined number of occurrences is selected as a function of the type of information to be transmitted in the second signal, said type of information to be transmitted in second signal including at least one the direction of rotation, excessive air gap or excessive brake lining wear.

16. A system according to claim 15, wherein the first signal assumes the two first current values periodically, and at least one of the two first current values is increased after the first signal has assumed said current value n times, where n is a number equal to or greater than one.

17. A system according to claim 16 wherein the number n is dependent on the signal generated by the second means.

18. A system according to claim 2, wherein the third means changes the first signal in a way which is carried out as a function depending on at least one signal of the group consisting of:

a signal representing the temperature of a wheel brake of the vehicle; and a signal representing the temperature of a rotational speed sensor; and a signal representing a supply voltage ($V_{CC}$) of the rotational speed sensor.

19. A system according to claim 11, wherein the system is part of a motor vehicle; wherein the first signal represents the rotational speed of the vehicle motor, said motor vehicle is a gasoline and/or diesel engine; wherein the second means generates a signal representing the rotational direction of the vehicle's engine; and wherein the evaluation means is an engine control unit which generates ignition and/or injection signals and which suppresses at least individual ignition signals in cases where it has been recognized that the vehicle's engine is rotating backwards.

20. A system according to claim 7 wherein the switching means has a first switch and a second switch and the first switch is located near a brake lining and the second switch near the rotational speed sensor.

21. A system according to claim 20 wherein said switches are transistors.

22. A system according to claim 8 wherein said switches are transistors.

23. A system for producing a signal representing a relative movement between a body of a vehicle and a wheel unit of said vehicle, said system comprising:

a first means for generating a first signal representing the movement between the body of the vehicle and a wheel unit of the vehicle relative to one another;

said first signal assuming at least two first values of current or voltage;

a second means for generating at least one second signal representing additional information, said second signal containing information representing whether the vehicle body is moving toward or away from the wheel unit; and a third means for changing at least one of the first values of the first signal, for a certain period of time, as a function of said second signal.

* * * * *